(12) United States Patent
Antchak et al.

(10) Patent No.: US 9,097,229 B2
(45) Date of Patent: Aug. 4, 2015

(54) ENGINE STARTER HAVING CLUTCH ASSEMBLY FOR SELECTIVE TRANSMISSION OF ROTARY POWER BETWEEN A PLATE STRUCTURE AND A DRIVE HUB

(75) Inventors: John R. Antchak, Woodbridge (CA); Warren Williams, Woodbridge (CA)

(73) Assignee: Litens Automotive Partnership, Woodbridge (CA)

( * ) Notice: Subject to any disclaimer, the term of this patent is extended or adjusted under 35 U.S.C. 154(b) by 335 days.

(21) Appl. No.: 13/704,023

(22) PCT Filed: Jun. 14, 2011

(86) PCT No.: PCT/CA2011/000754
§ 371 (c)(1),
(2), (4) Date: Dec. 13, 2012

(87) PCT Pub. No.: WO2011/156917
PCT Pub. Date: Dec. 22, 2011

(65) Prior Publication Data
US 2013/0081588 A1    Apr. 4, 2013

Related U.S. Application Data

(60) Provisional application No. 61/354,302, filed on Jun. 14, 2010.

(51) Int. Cl.
*F02N 15/02* (2006.01)
*F02N 15/00* (2006.01)
*F02N 15/06* (2006.01)
(Continued)

(52) U.S. Cl.
CPC .............. *F02N 15/00* (2013.01); *F02N 15/022* (2013.01); *F02N 15/025* (2013.01); *F02N 15/067* (2013.01); *F16D 27/025* (2013.01); *F16D 27/105* (2013.01); *F02N 2250/08* (2013.01)

(58) Field of Classification Search
CPC ..... F02N 15/022; F02N 15/025; F02N 5/067; F02N 11/00; F02N 2250/08; F16D 27/04; F16D 27/025; F16D 27/105
USPC ...... 74/7 C; 123/179.1, 179.25; 192/42, 41 S, 192/81 C, 35, 84.81
See application file for complete search history.

(56) References Cited

U.S. PATENT DOCUMENTS 3,349,880 A * 10/1967 Baer .......................... 192/84.81
4,263,995 A *  4/1981 Wahlstedt ........................ 192/35
4,570,768 A *  2/1986 Nishimura et al. ............. 192/35
(Continued)

FOREIGN PATENT DOCUMENTS

WO    2006/016668 A1    2/2006
WO    2010/130058 A1    11/2010

OTHER PUBLICATIONS

International Search Report and Written Opinion of the ISA for PCT/CA2011/000754, ISA/CA, mailed Sep. 26, 2011.

*Primary Examiner* — Lindsay Low
*Assistant Examiner* — Robert Werner
(74) *Attorney, Agent, or Firm* — Harness, Dickey & Pierce, P.L.C.

(57) ABSTRACT

An engine starter apparatus having a clutch assembly and a ring gear or pulley. The clutch assembly has a plate structure, a drive hub and a clutch element for selectively coupling the drive hub to the plate structure. The ring gear or pulley is coupled to the plate structure.

14 Claims, 18 Drawing Sheets

(51) Int. Cl.
  *F16D 27/02* (2006.01)
  *F16D 27/105* (2006.01)

(56) References Cited

U.S. PATENT DOCUMENTS

| | | | | |
|---|---|---|---|---|
| 4,704,554 | A | * | 11/1987 | Nishimura ........................ 310/72 |
| 4,825,988 | A | * | 5/1989 | Nishimura ............... 192/12 BA |
| 5,031,745 | A | * | 7/1991 | Nishimura ................. 192/84.81 |
| 5,099,974 | A | * | 3/1992 | Spechko .................... 192/84.81 |
| 5,135,086 | A | * | 8/1992 | Ciolli ........................... 192/48.3 |
| 5,687,822 | A | * | 11/1997 | Arai ........................... 192/84.81 |
| 5,967,274 | A | * | 10/1999 | Leone et al. ..................... 192/35 |
| 7,594,490 | B2 | * | 9/2009 | Ono ......................... 123/179.24 |
| 7,892,124 | B2 | * | 2/2011 | Hodjat et al. .................... 474/94 |
| 2005/0236245 | A1 | * | 10/2005 | Maurice et al. ............. 192/17 C |
| 2007/0240964 | A1 | * | 10/2007 | Saito et al. .................... 192/41 S |
| 2008/0163842 | A1 | | 7/2008 | Forssel et al. |
| 2008/0163843 | A1 | | 7/2008 | Sakai et al. |
| 2010/0122822 | A1 | | 5/2010 | Corre |
| 2010/0230227 | A1 | | 9/2010 | Parsons et al. |
| 2010/0315507 | A1 | | 12/2010 | Chrobocinski et al. |

\* cited by examiner

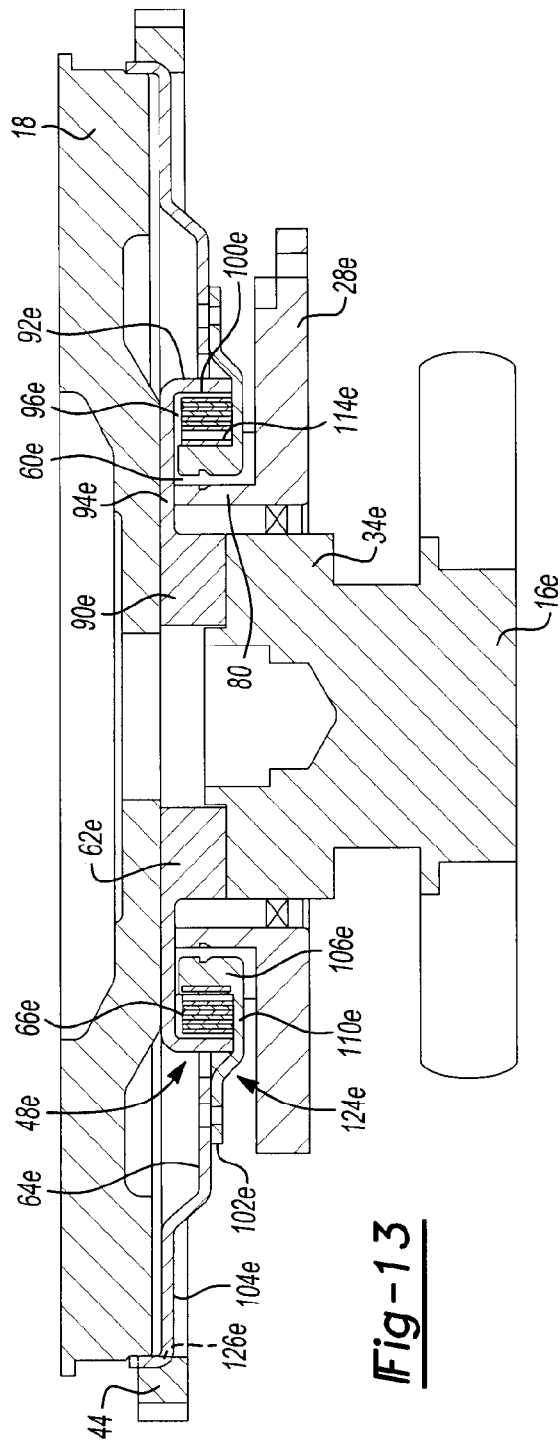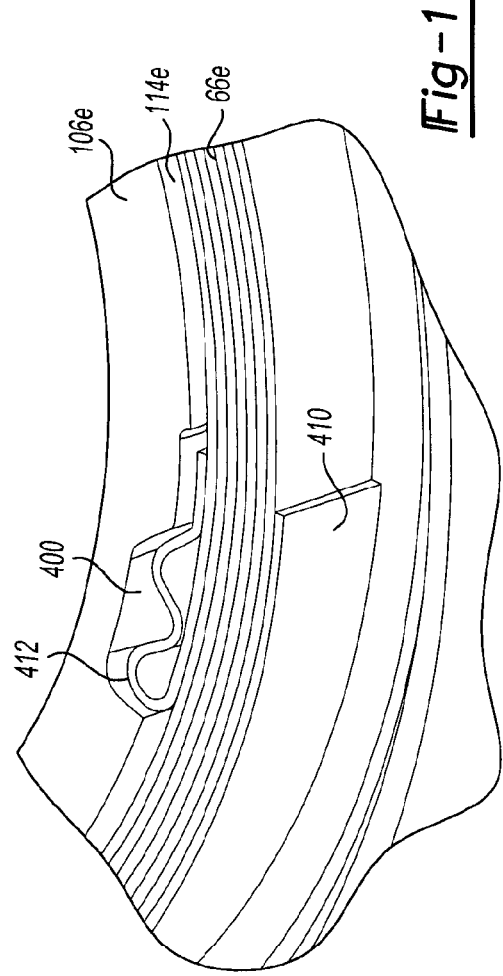

ENGINE STARTER HAVING CLUTCH ASSEMBLY FOR SELECTIVE TRANSMISSION OF ROTARY POWER BETWEEN A PLATE STRUCTURE AND A DRIVE HUB

CROSS-REFERENCE TO RELATED APPLICATIONS

This application is a 371 U.S. National Stage of International Application No. PCT/CA2011/000754, filed Jun. 14, 2011, and published in English on Dec. 22, 2011 as WO 2011/156917 A2, which claims the benefit of U.S. Provisional Patent Application No. 61/354,302 filed Jun. 14, 2010. The disclosure of each of the above-referenced applications is incorporated by reference as if fully set forth in detail herein.

INTRODUCTION

The present disclosure relates to an engine starter.

Internal combustion engines are typically started via an electric starter motor. In most conventional starting systems, the electric starter motor is equipped with a pinion gear that can be engaged to a ring gear that is mounted to a crankshaft-driven flywheel or flexplate. The pinion gear is typically maintained axially apart from the ring gear (i.e., so that the pinion gear and ring gear are disengaged from one another), but is translated into engagement with the ring gear upon activation of the electric starter motor. The electric starter motor can drive or rotate the pinion gear to cause corresponding rotation of the crankshaft (via the ring gear and the flywheel or flexplate). When the internal combustion engine starts and the electric starter motor is de-activated, the pinion gear translates out of engagement with the ring gear so that the electric starter motor is not driven by the crankshaft.

The limited lifespan of such starting systems is well known and can be problematic in vehicle powertrain systems that require more frequent starting (e.g., start-stop hybrids). Accordingly, an improved engine starter is desired.

SUMMARY

This section provides a general summary of the disclosure, and is not a comprehensive disclosure of its full scope or all of its features.

In one form, the present teachings provide an engine starter apparatus having a clutch assembly and a ring gear or pulley. The clutch assembly has a plate structure, a drive hub and a clutch element for selectively coupling the drive hub to the plate structure. The ring gear or pulley is coupled to the plate structure.

In another form, the present teachings provide an engine starter apparatus that includes a clutch assembly and a ring gear or a pulley. The clutch assembly has a plate structure, a drive hub, a clutch element and an actuator. The actuator comprises a member that is axially movable to selectively initiate engagement of the clutch element to a circumferentially extending surface of the drive hub. The clutch element comprises a helically wound spring wire having a first end and a second end. The first end of the helically wound spring wire is configured to receive rotary power from the plate structure, while the second end is coupled to the member for rotation therewith. The ring gear or pulley is coupled to the plate structure for rotation therewith.

In another form, the teachings of the present disclosure provide a method for starting an engine in which a clutch assembly is provided between a starter motor and a flywheel or flex plate. The clutch assembly is engaged in response to the generation of a drag force when the starter motor is operating.

In a further form, the present disclosure provides an engine assembly having an engine block, a crankshaft, a lubricating oil, a flywheel or flexplate and an engine starter. The crankshaft is mounted for rotation in the engine block. The lubricating oil is disposed in the engine block and is configured to lubricate engine components including the crankshaft. The flywheel or flexplate is coupled for rotation with the crankshaft. The engine starter has a motor, a transmission and a clutch. The transmission is driven by the motor and includes an output member. The clutch is disposed axially between the crankshaft and the flywheel or flexplate. The clutch includes a clutch element that is configurable in a first state in which the output member of the transmission is not drivingly coupled to the flywheel or flexplate. The clutch element is also configurable in a second state in which the output member of the transmission is drivingly coupled to the flywheel or flexplate. The lubricating oil is not employed to lubricate the clutch element.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 2A is an enlarged portion of the exploded perspective view of FIG. 2 illustrating the clutch element in more detail;

FIG. 7A is an enlarged portion of the exploded perspective view of FIG. 7 illustrating the clutch element in more detail;

FIG. 10A is an enlarged portion of the exploded perspective view of FIG. 10 illustrating the clutch element in more detail;

FIG. 13 is a longitudinal section view of a portion of the vehicle of FIG. 12 taken along the rotational axis of the crankshaft and illustrating the sixth engine starter in more detail; and FIG. 14 is a perspective view of a portion of the sixth engine starter constructed in accordance with the teachings of the present disclosure illustrating the clutch element as engaged to the plate structure;

Corresponding reference numerals indicate corresponding parts throughout the several views of the drawings.

DETAILED DESCRIPTION OF THE VARIOUS EMBODIMENTS

Example embodiments will now be described more fully with reference to the accompanying drawings.

Figure 1:
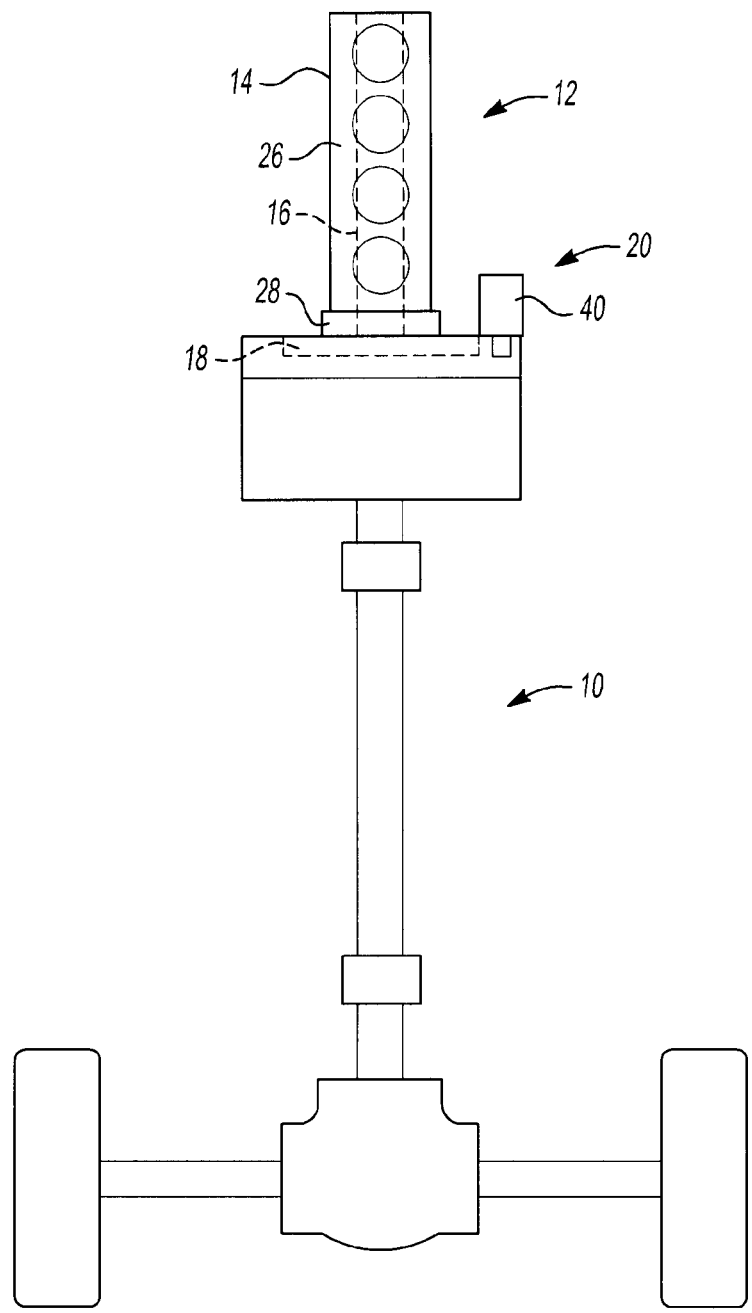
FIG. 1 is a schematic illustration of a vehicle having an engine starter constructed in accordance with the teachings of the present disclosure.
Figure 2:
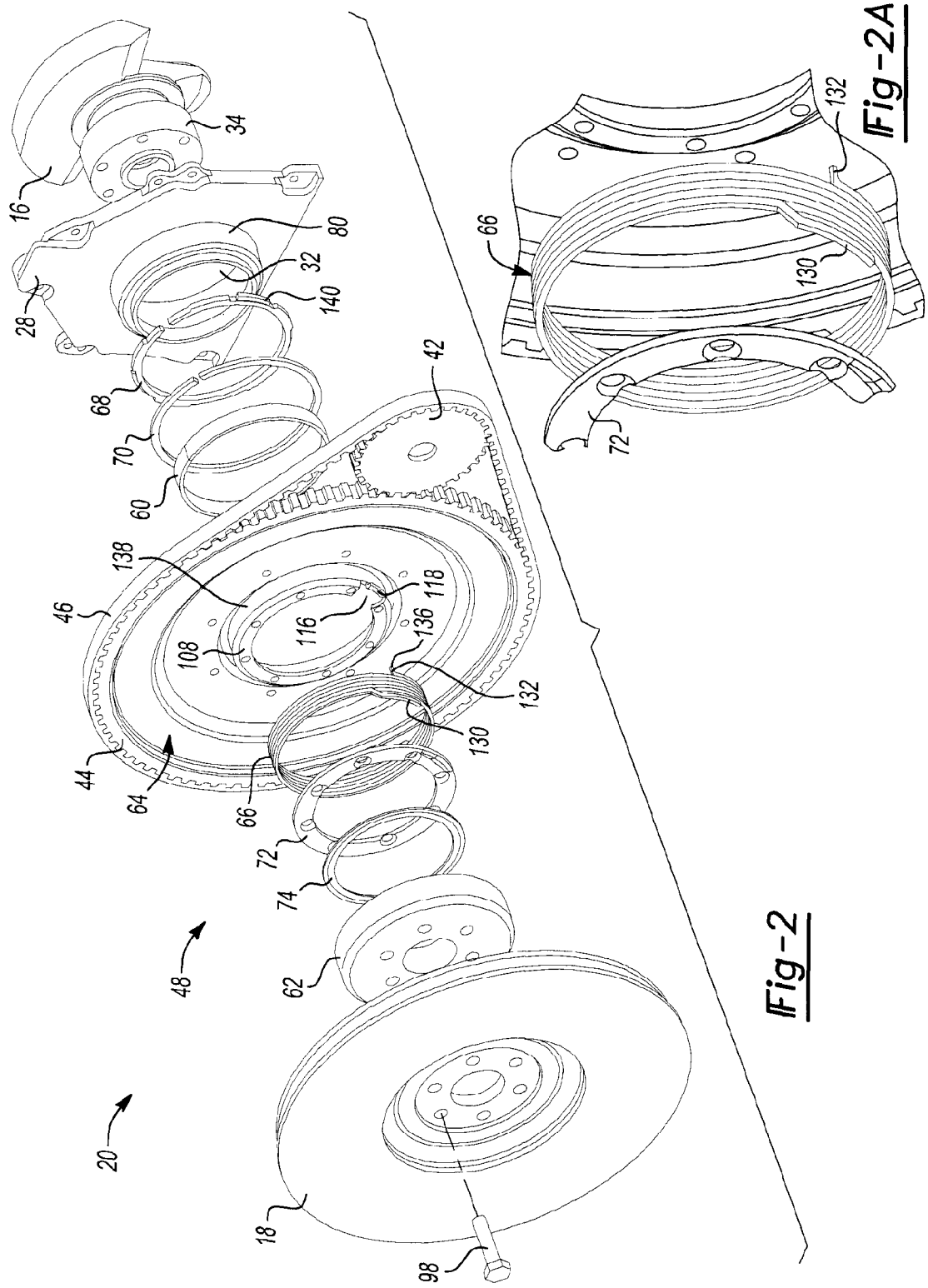
FIG. 2 is an exploded perspective view of a portion of the vehicle of FIG. 1 illustrating the engine starter in more detail.
Figure 3:
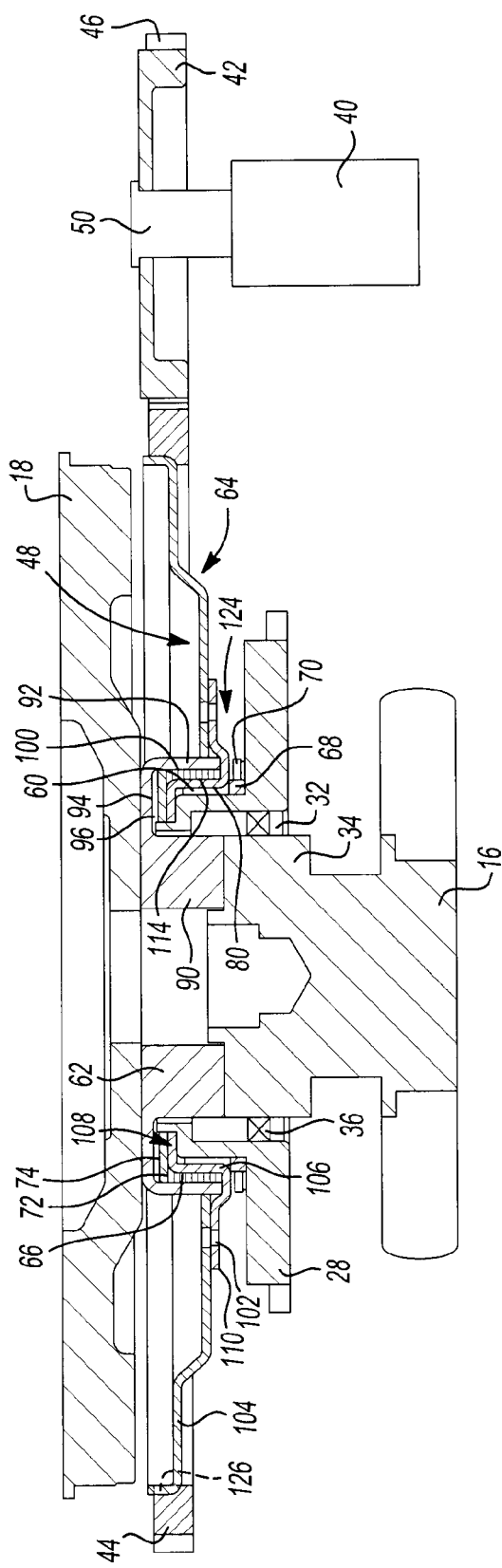
FIG. 3 is a longitudinal section view of a portion of the vehicle of FIG. 1 taken along the rotational axis of the crankshaft and illustrating the engine starter in more detail.

With reference to FIGS. 1 through 3 of the drawings, a vehicle constructed in accordance with the teachings of the present disclosure is generally indicated by reference numeral 10. The vehicle 10 can include an internal combustion engine 12 that can include an engine housing 14, a crankshaft 16, a flywheel 18 and an engine starter 20. The engine housing 14 can include an engine block 26 and an engine cover 28. The crankshaft 16 can be mounted to the engine block 26 for rotation therein. The engine cover 28 can be coupled to an end of the engine block 26 and can include an aperture 32 through which an end 34 of the crankshaft 16 can extend. An oil seal 36 (FIG. 3) can be received in the aperture 32 and can form a seal between the engine cover 28 and the end of the crankshaft 16. The flywheel 18 can be coupled for rotation with the end 34 of the crankshaft 16. Those of skill in the art will appreciate that while the vehicle 10 is described and illustrated herein as including a flywheel, the vehicle could include a flexplate in the alternative.

Figure 4:
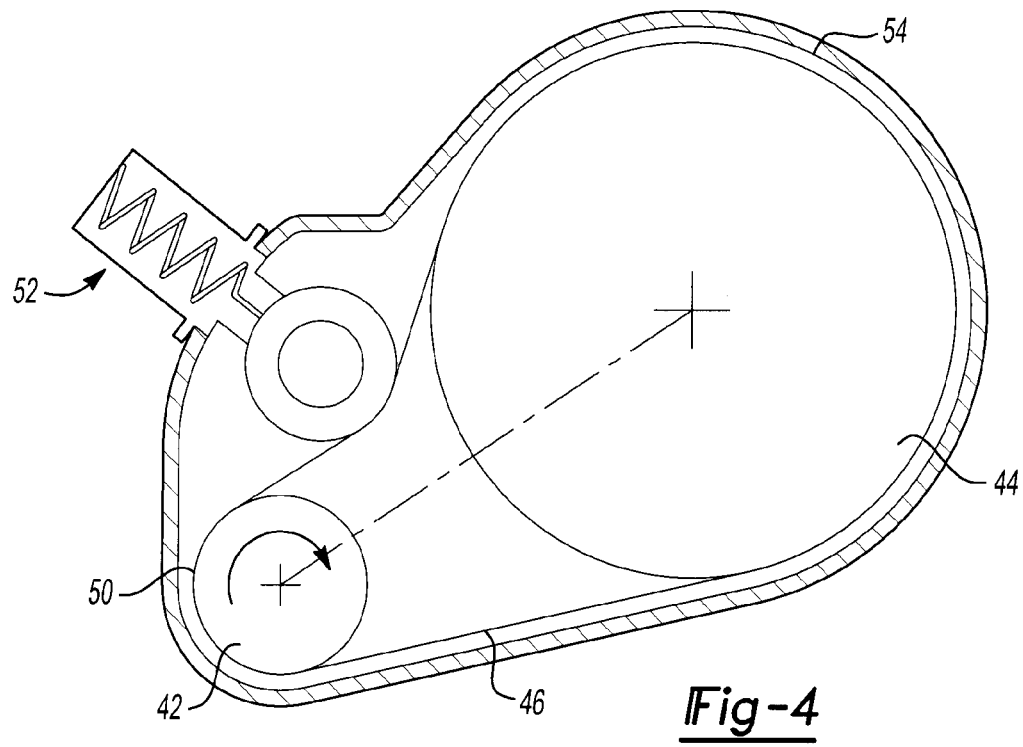
FIG. 4 is a cross-sectional view of a portion of an engine showing a second engine starter constructed in accordance with the teachings of the present disclosure.

With reference to FIGS. 2 and 3, the engine starter 20 can include a motor 40, a first pulley 42, a second pulley 44, an endless power transmitting element 46 and a clutch 48. The motor 40 can be powered in any desired manner (e.g., electrically, pneumatically, hydraulically) and can comprise a rotary output member 50 that can drive the first pulley 42. The second pulley 44 can be disposed about the end 34 of the crankshaft 16 as will be discussed in detail, below. The endless power transmitting element 46 can be a belt or a chain and can engage the first and second pulleys 42 and 44 to transmit rotary power from the first pulley 42 to the second pulley 44. In the particular example provided, the endless power transmitting element 46 is a cogged or toothed belt and the first and second pulleys 42 and 44 have corresponding teeth for engaging the teeth of the belt. It will be appreciated that other types of belts could be employed in the alternative, including a helically opposed tooth belt, a V-belt or a poly-V belt. Depending on the particular belt selected, those of skill in the art will appreciate that it may be desirable or necessary to include an appropriately shaped flange or lip on a corresponding side of one or both of the first and second pulleys 42 and 44 to maintain the belt in engagement with the first and second pulleys 42 and 44. Moreover, those of skill in the art will further appreciate that a tensioner assembly 52 can be employed to maintain a desired amount of tension on the endless power transmitting element 46 as is shown in FIG. 4. The example of FIG. 4 employs a spring-biased linear tensioner assembly 52 that is mounted to the flywheel or bell housing 54, but those of skill in the art will appreciate that other types of tensioner assemblies could be employed in the alternative.

Returning to FIGS. 2 and 3, the clutch 48 can include a bearing 60, a drive hub 62, a plate structure 64, a clutch element 66, a friction ring 68, a snap ring 70, a drive plate 72 and a retaining spring 74. The bearing 60 can be any type of bearing or bushing and can be received over an annular projection 80 on the engine cover 28 that is concentric with the aperture 32.

The drive hub 62 can include a central hub 90, a circumferentially extending outer wall member 92 and a flange member 94 that can couple the central hub 90 to the wall member 92 so as to form an annular cavity 96 between the central hub 90 and the wall member 92. Threaded fasteners 98 can be employed to fixedly but removably couple the flywheel 18 and the central hub 90 to the end 34 of the crankshaft 16 for rotation therewith. The wall member 92 can have an interior circumferential surface 100 that can be hardened in an appropriate manner (e.g., case hardened and/or nitrided).

While the drive hub 62 has been illustrated and described as being formed from a suitable metal, it will be appreciated that the drive hub 62 could be formed of several discrete components that can be assembled together. For example, a relatively soft material, such as a high quality rubber, a nylon, a combination of rubber and nylon, or a thermosetting material, such as phenolic, can be coupled to a metal structure such that the relatively soft material forms the interior circumferential surface 100 for increased compliance.

The plate structure 64 can be coupled to the second pulley 44 in any desired manner. For example, the plate structure 64 and the second pulley 44 could be integrally formed. In the particular example provided, however, the plate structure 64 is a weldment and the second pulley 44 is fixedly coupled to an outer circumferential portion of the plate structure 64. In this regard, the plate structure 64 can comprise a first plate member 102 and a second plate member 104. The first plate member 102 can include an annular portion 106, a first flange member 108 coupled to a first end of the annular portion 106, and a second flange member 110 coupled to an opposite end of the annular portion 106. The annular portion 106 can be sized to be received over the bearing 60 such that the bearing 60 can support the annular portion 106 (and thereby the plate structure 64) for rotation on the annular projection 80. The annular portion 106 can be received in the annular cavity 96 in the drive hub 62 and can include an outer circumferential surface 114 that can be spaced apart from the interior circumferential surface 94. The first flange member 108 can be oriented generally perpendicular to the annular portion and can extend radially inwardly therefrom. A notch 116 can be formed in the first flange member 108 and a portion of the material proximate the notch 116 can be deformed to form a helical ramp 118. The second flange member 110 can extend radially outwardly from the annular portion 106 and can be shaped as desired so as to not contact the drive hub 62. In the particular example provided, the second flange member 110 includes an offset zone 124 that wraps around the wall member 92 of the drive hub 62 to aid in the formation of a labyrinth that is resistant to the ingress of material into/egress of material (e.g., a lubricant) out of the annular cavity 96. The second flange member 110 can be coupled in any desired manner (e.g., fasteners, adhesives, brazing, welding) to the second flange member 110 and can include an outer rim portion 126 to which the second pulley 44 is fixedly coupled.

The clutch element 66 can comprise a wrap spring that can be formed of a plurality of wraps. The clutch element 66 can be received in the annular cavity 96 between the interior circumferential surface 100 of the outer wall member 92 and the outer circumferential surface 114 of the annular portion 106 and can be frictionally engaged to the outer circumferential surface 114 of the annular portion 106. The wrap spring can be formed of a suitable material, such as a relatively hard spring steel, and can have an appropriate cross-sectional shape, such as a generally square or generally rectangular cross-sectional shape, in which the surfaces of the cross-sectional shape are generally flat or somewhat convex in shape. It will be appreciated, however, that the wire of the wrap spring could have any desired cross-sectional shape, including a round cross-sectional shape. Moreover, the wire could be a "plain" wire, or could be coated with a desired coating (e.g., nickel plating) and/or can be lubricated with a desired lubricant, such as a grease. With additional reference to FIG. 2A, the clutch element 66 can include a first end 130 and a second end 132 that is disposed on a side of the clutch element 66 opposite the first end 130. With brief reference to FIG. 5, the first end 130 can include a first end face 134 (of the wire that forms the wrap spring); the first end 130 can extend over the ramp 118 on the first flange member 108. Returning to FIGS. 2 and 3, the second end 132 can include a second end face 136 and can extend through a slot 138 formed in the plate structure 64. In the particular example provided, the slot 138 is formed in the first plate member 102.

The friction ring 68 can be a generally C-shaped member that can be received between the plate structure 64 and the engine cover 28 and engaged to the annular projection 80 on the engine cover 28. The friction ring 68 can include projections (e.g., ribs, hooks, bumps, tabs) or apertures (e.g., holes, slots, recessed areas) that can be configured to engage the second end face 136 of the second end 132 of the clutch element 66. In the particular example provided, the friction ring 68 includes a series of circumferentially spaced-apart projections 140 that are configured to abut the second end face 136 of the second end 132 of the clutch element 66.

The snap ring 70 can be received about the friction ring 68 and can be employed to apply a compressive force to the friction ring 68 that causes the friction ring 68 to frictionally engage the annular projection 80 on the engine cover 28.

Figure 5:
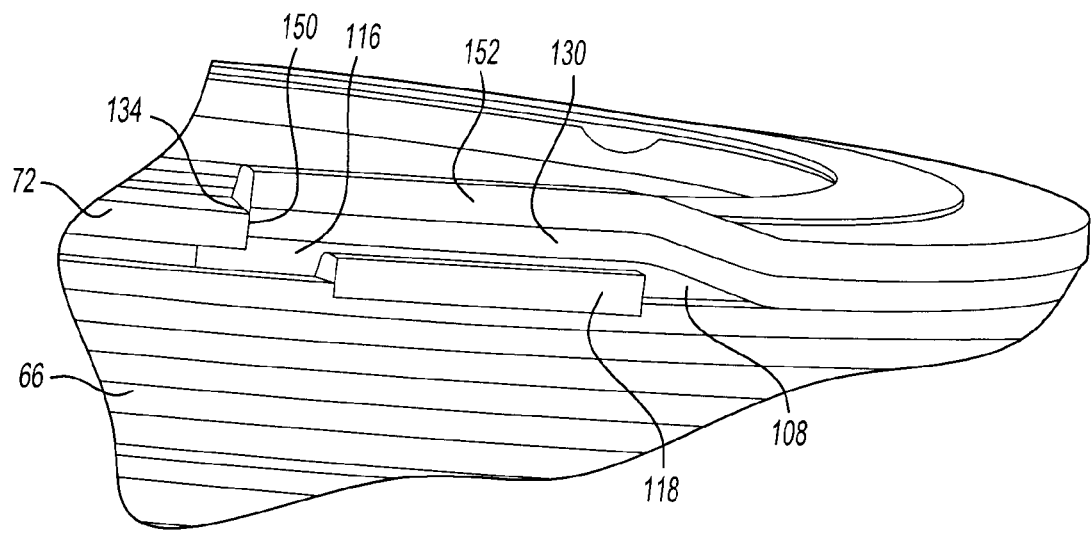
FIG. 5 is a perspective view of a portion of the vehicle of FIG. 1 illustrating a portion of the engine starter in more detail.

With reference to FIGS. 2 and 5, the drive plate 72 can include a radially projecting edge 150 and a helical cover portion 152. In the particular example provided, the helical cover portion 152 is slit or pierced and bent upwardly from a remainder of the drive plate 72 to form and expose the radially projecting edge 150. The drive plate 72 can be fixedly coupled to the first flange member 108, e.g., via a plurality of threaded fasteners or rivets (not shown). The first end 130 of the clutch element 66 can be received between the helical ramp 118 and the helical cover portion 152 such that the first end face 134 is abutted against the radially projecting edge 150.

The retaining spring 74 can be an annular spring washer (e.g., Bellville spring washer) that can be press-fit onto the annular portion 80 of the engine cover 28 and configured to limit axial movement of the plate structure 64 and the drive plate 72 in a direction away from the engine 12 (FIG. 1).

With reference to FIGS. 2, 3 and 5, when the crankshaft 16 is rotating to provide rotary power to the flywheel 18 and the motor 40 is not operated to drive the second pulley 44 (via the endless power transmitting element 46 and the first pulley 42), the clutch element 66 is retracted away from the interior circumferential surface 100 of the wall member 92 and consequently, rotary power is not transmitted from the drive hub 62 through the clutch element 66 to the plate structure 64.

When the motor 40 is operated to drive the second pulley 44 (via the endless power transmitting element 46 and the first pulley 42) at a speed that is greater than a rotational speed of the crankshaft 16, rotation of the drive plate 72 (which rotates with the plate structure 64) drives the radially projecting edge 150 into contact with the first end face 134 of the first end 130 of the clutch element 66. Power input to the clutch element 66 travels longitudinally through the coils of the material that makes up the clutch element 66 (i.e., the coils of wire in the example provided) and rotary power is output from the clutch element 66 via the second end 132 of the clutch element 66. In the example provided, rotary power is transmitted from the second end face 136 into a corresponding one of the spaced-apart projections 140 on the friction ring 68. As the friction ring 68 frictionally engages the annular projection 80 on the engine cover 28, the clutch element 66 will tend to unwind such that the coils 66a of the clutch element 66 engage the interior circumferential surface 100 of the wall member 92 to transmit rotary power into the drive hub 62 to thereby drive the crankshaft 16 and start the engine 12 (FIG. 1).

It may be that the friction torque required to be generated by the friction ring 68 is higher than the torque rate of the clutch element 66, which may in some situations prevent the clutch element 66 from returning to it's closed position. After starting the engine 12 (FIG. 1), the motor 40 could be employed to reverse the rotation of second pulley 44 through a predetermined angle (relative to the crankshaft 16), such as an angle that is less than or equal to 45 degrees, to relieve tension on the clutch element 66 to permit it to unwind and return to a state where it is disengaged from the interior circumferential surface 100 of the wall member 92.

The motor 40 can be sized to output relatively more torque than a traditional starter motor, can have a high speed capacity and/or can be controlled in a manner similar to a servo motor.

The first pulley 42 can have an effective diameter that is relatively larger than the effective diameter (i.e., pitch diameter) of a pinion associated with a traditional starter so as to reduce the stress on the endless power transmitting element 46 and to reduce the rotational speed of the motor 40 when the motor 40 is driven by the engine 12 (FIG. 1). The second pulley 44 can also have an effective diameter that is relatively smaller than the effective diameter (i.e., pitch diameter) of a ring gear associated with a traditional starter to more easily package the engine starter 20 into a vehicle. Moreover, the second pulley 44 can be formed of a relatively lightweight material, such as plastic or aluminum.

Figure 6:
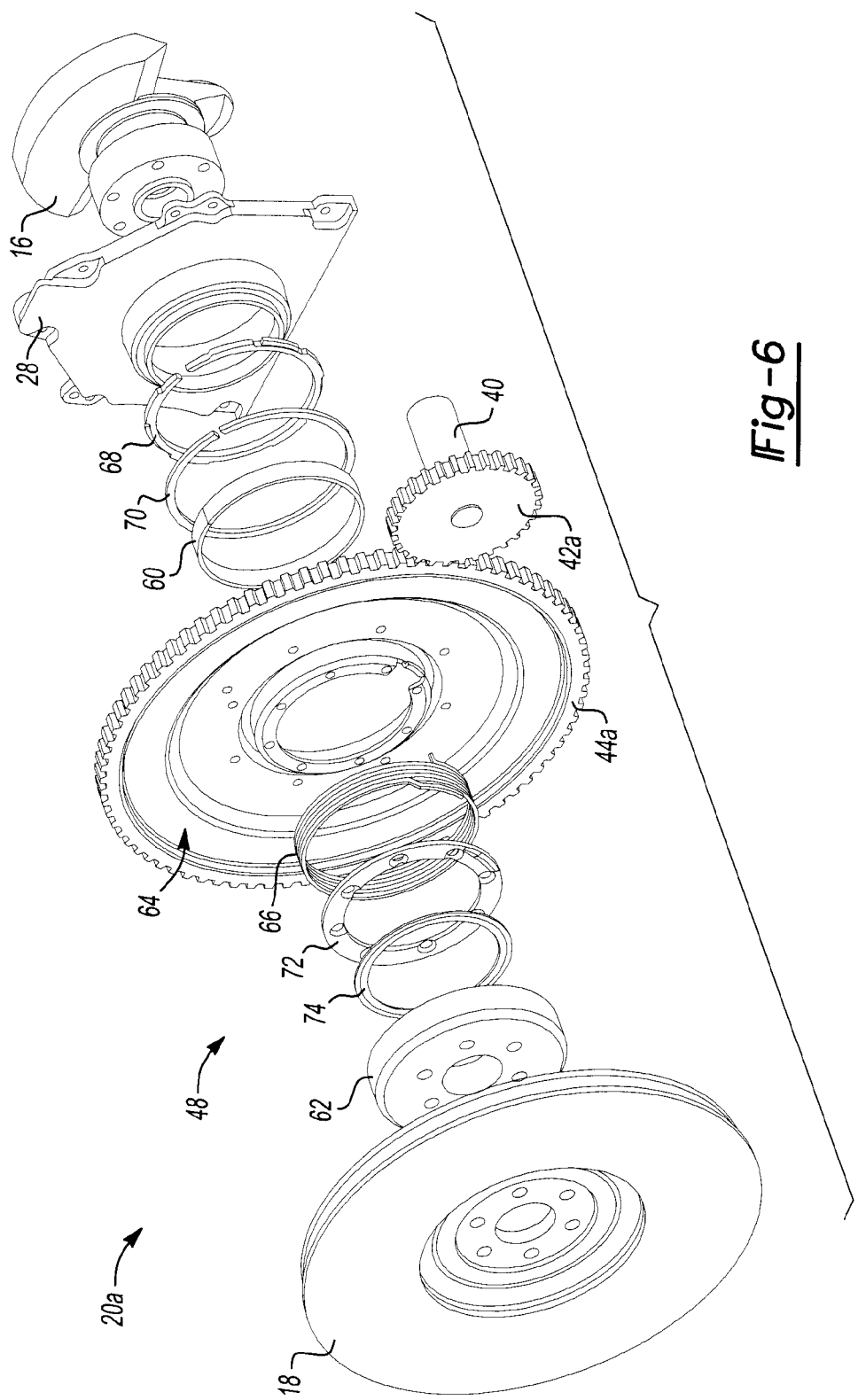
FIG. 6 is an exploded perspective view of a portion of another vehicle illustrating a third engine starter constructed in accordance with the teachings of the present disclosure.

The example of FIG. 6 is generally similar to the example of FIGS. 1-3, except that a ring gear 44a has replaced the second pulley 44 (FIG. 2), a pinion gear 42a has replaced the first pulley 42 (FIG. 2), and teeth of the pinion gear 42a directly engage teeth of the ring gear 44a to transmit rotary power between the pinion gear 42a and the ring gear 44a. In some situations, the ring gear 44a and/or the pinion gear 42a can be formed of plastic or can be a plastic coated metal composite. Construction in this manner may help avoid fretting where the teeth of the pinion gear 42a and the ring gear 44a stay in stationary contact with one another and/or reduce gear mesh noise.

Figure 7:
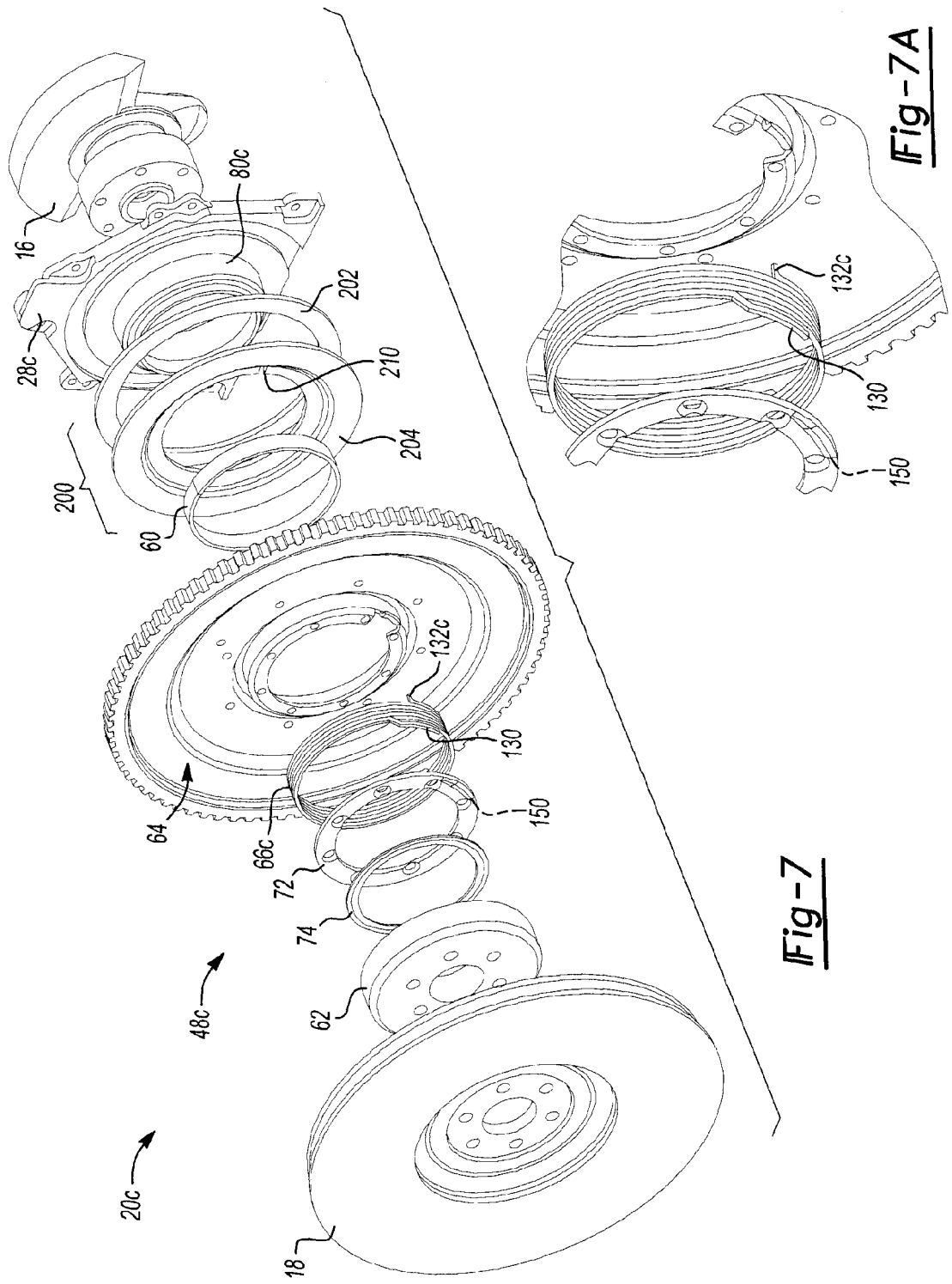
FIG. 7 is an exploded perspective view of a portion of another vehicle illustrating a fourth engine starter constructed in accordance with the teachings of the present disclosure.
Figure 8:
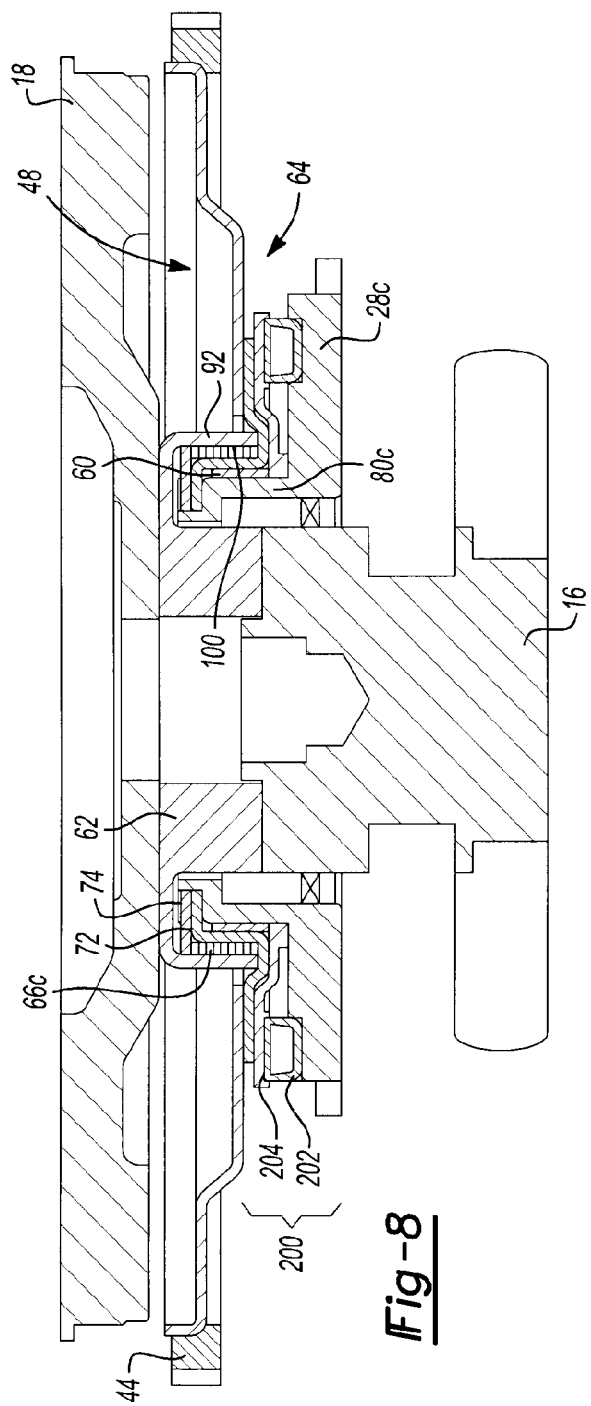
FIG. 8 is a longitudinal section view of a portion of the vehicle of FIG. 7 taken along the rotational axis of the crankshaft and illustrating the fourth engine starter in more detail.
Figure 9:
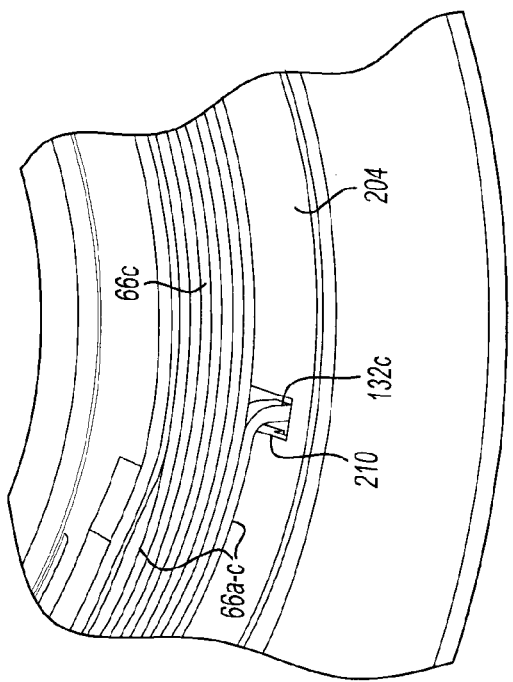
FIG. 9 is a perspective view of a portion of the fourth engine starter illustrating the coupling of the clutch element and the armature of the electronic actuator.

The example of FIGS. 7 through 9 is generally similar to the example of FIGS. 1 through 3, except that the clutch 48c includes an electromagnetic actuator 200 instead of a friction ring 68 (FIG. 2) and a snap ring 70 (FIG. 2). The electromagnetic actuator 200 can include a coil assembly 202 that can be fixedly mounted to the engine cover 28c, and an armature 204. The armature 204 can be fixedly coupled to the second end 132c of the clutch element 66c and can be mounted for rotation on the annular projection 80c on the engine cover 28c. In the particular example provided, the second end 132c of the clutch element 66c is oriented generally perpendicular to the coils of wire (generally parallel to the longitudinal axis of the clutch element 66c) and received into a slot 210 formed in the armature 204.

When the crankshaft 16 is rotating to provide rotary power to the flywheel 18 and the coil assembly 202 is not activated, the clutch element 66c is retracted away from the interior circumferential surface 100 of the wall member 92 and consequently, rotary power is not transmitted from the drive hub 62 through the clutch element 66c to the plate structure 64.

When the motor 40 (FIG. 2 or FIG. 6) is operated to drive the second pulley 44 (via the endless power transmitting element 46 and the first pulley 42 or via a pinion gear 42a and a ring gear 44a) at a speed that is greater than a rotational speed of the crankshaft 16, rotation of the drive plate 72 (which rotates with the plate structure 64) drives the radially projecting edge 150 into contact with the first end face 134 (FIG. 5) of the first end 130 of the clutch element 66c. Power input to the clutch element 66c travels longitudinally through the coils of the material that makes up the clutch element 66c (i.e., the coils of wire in the example provided) and rotary power is output from the clutch element 66c via the second end 132c of the clutch element 66c. As the second end 132c of the clutch element 66c is coupled to the armature 204, the armature 204 will be driven about the annular projection 80c on the engine cover 28c. Activation of the coil assembly 202 generates a magnetic field that resists rotation of the armature 204, thereby applying a drag force that tends to cause the clutch element 66c to unwind such that the coils 66a-c of the clutch element 66c engage the interior circumferential surface 100 of the wall member 92 to transmit rotary power into the drive hub 62 to thereby drive the crankshaft 16 and start the engine. Upon deactivation of the coil assembly 202, the armature 204 can rotate about the projection 80c such that the clutch element 66c unwinds and the clutch element 66c disengages the interior circumferential surface 100 of the wall member 92 to halt torque transmission through the clutch 48c.

It will be appreciated that with appropriate motor and gear sizing, the starter system 20c of the example of FIGS. 7 through 9 could be employed to provide propulsive power to a vehicle, such as "launch assist", in which propulsive power is provided by the motor 40 (FIG. 2 or 6) in addition to the engine and/or in a mode where propulsive power is provided only by the motor 40 (FIG. 2 or 6). Moreover, the addition of a second electromagnetic coil (not shown) and an associated wrap clutch mechanism (not shown) on the outside of the drive hub 62c could be used to rotationally lock the plate structure 64 to the drive hub 62c to effectively drive the motor 40 (FIG. 2 or 6) so that the motor 40 (FIG. 2 or 6) could be employed as a generator to provide re-generative braking capabilities in which an electrical resistive load (i.e., the generation of electricity) is employed to slow the vehicle.

Figure 10:
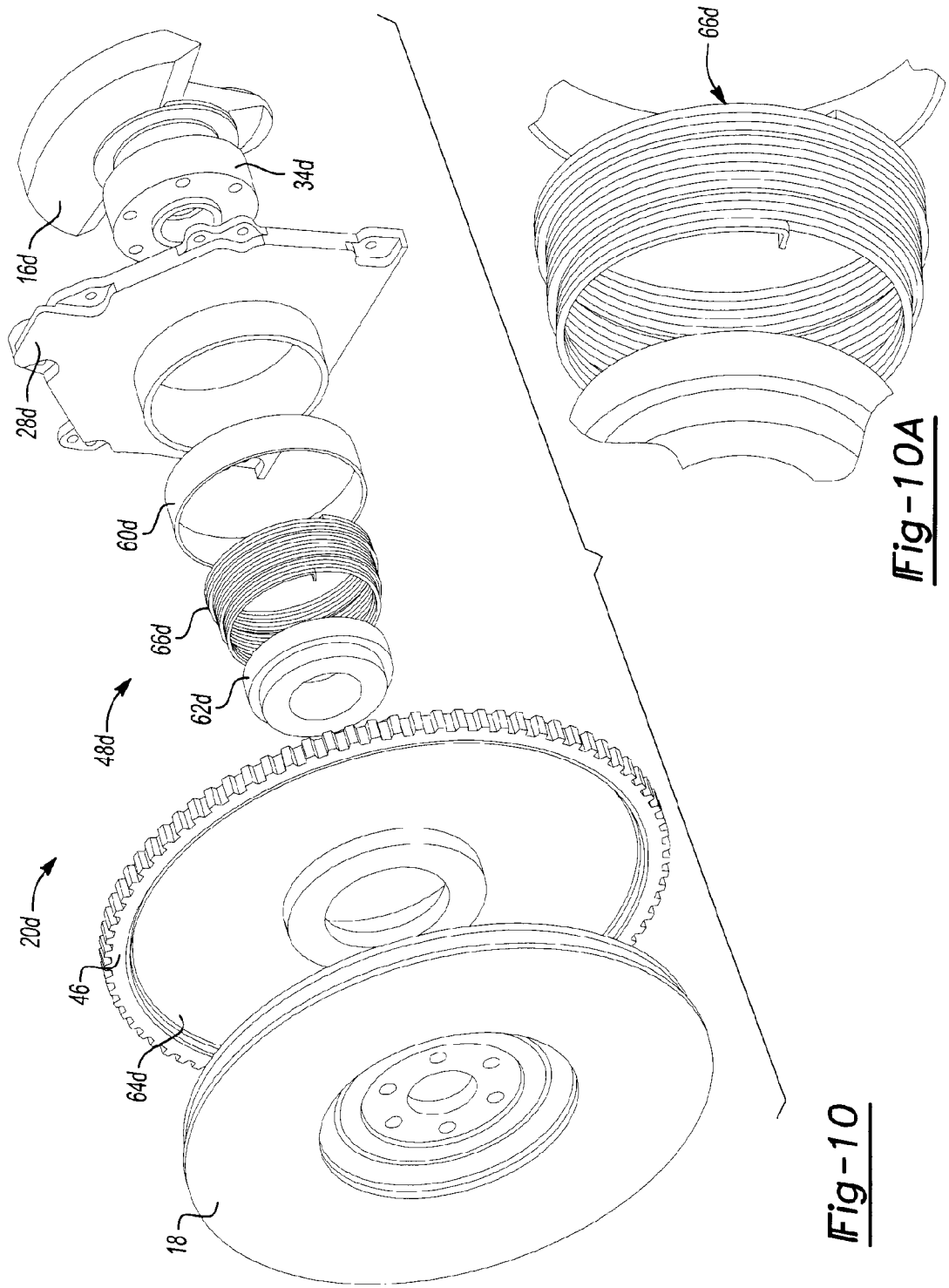
FIG. 10 is an exploded perspective view of a portion of another vehicle illustrating a fifth engine starter constructed in accordance with the teachings of the present disclosure.
Figure 11:
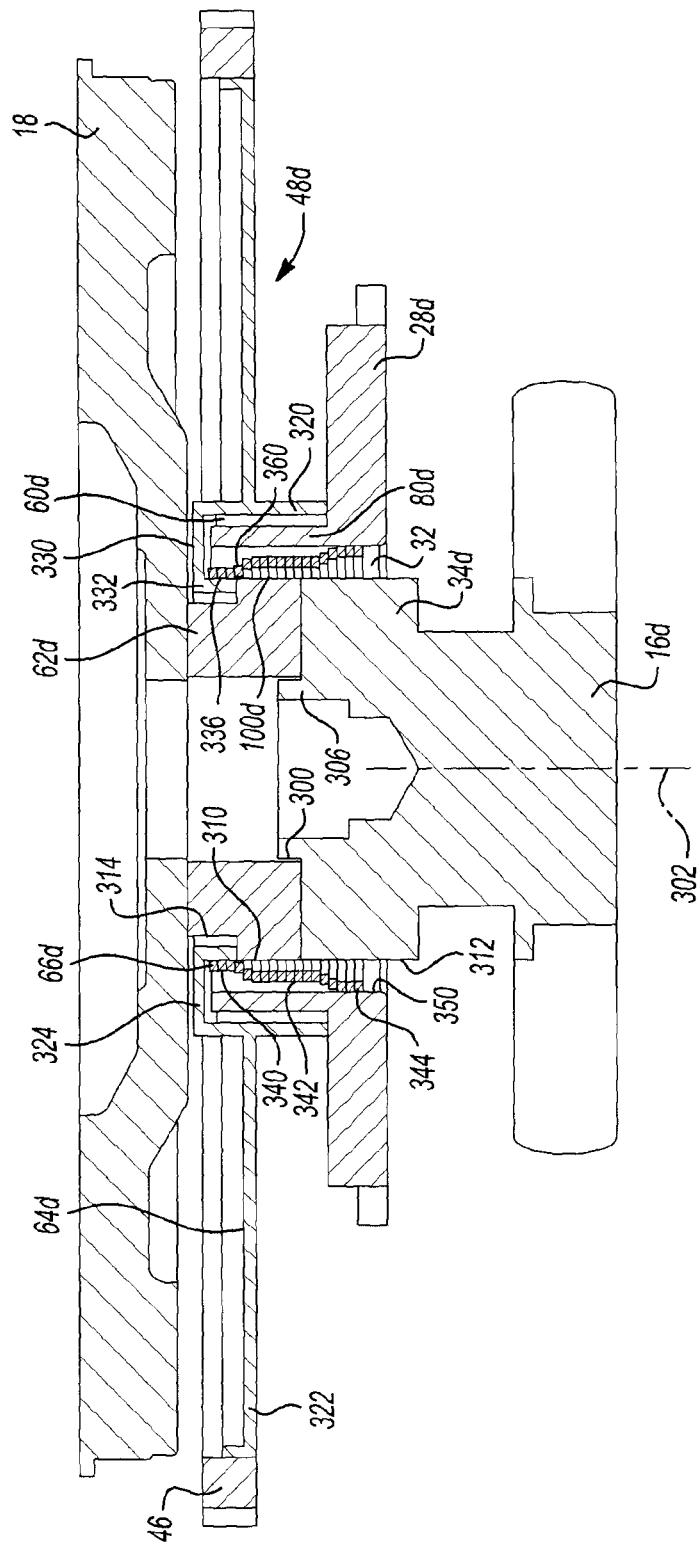
FIG. 11 is a longitudinal section view of a portion of the vehicle of FIG. 10 taken along the rotational axis of the crankshaft and illustrating the fifth engine starter in more detail.

In the example of FIGS. 10 through 11, the clutch 48d can include a bearing 60d, a drive hub 62d, a plate structure 64d and a clutch element 66d. The bearing 60d can be any type of bearing or bushing and can be received over the annular portion 80 of the engine cover 28d.

The drive hub 62d can be received axially between the end 34d of the crankshaft 16d and the flywheel 18. One or more fasteners (not shown) can be employed to secure the flywheel 18 and the drive hub 62d to the crankshaft 16d for rotation therewith. The drive hub 62d can include an outer circumferential surface 100d and a locating feature 300 that can be employed to locate the drive hub 62d to the rotational axis 302 of the crankshaft 16d. The locating feature 300 can be a bore of a predetermined diameter that can matingly engage a corresponding feature 306, such as an annular projection, that can be formed on the end 34d of the crankshaft 16d. Those of skill in the art will appreciate that other types of locating features could be employed, including one or more dowels and/or shoulder bolts. The outer circumferential surface 100d of the drive hub 62d can include a first portion 310, which can match the diameter of the outer surface 312 of the end 34d of the crankshaft 16d, and a second portion 314 that can be somewhat smaller in diameter to provide radial clearance for the plate structure 64d.

The plate structure 64d can include a main hub portion 320, an outer annular flange 322 and an inner annular flange 324. The main hub portion 320 can be a generally tubular structure that can be received onto the bearing 60d so as to be rotatably disposed on the annular projection 80d of the engine cover 28d. The outer annular flange 322 can extend radially outwardly from the main hub portion 320 and the second pulley 44 (or a ring gear) can be coupled for rotation thereto. The annular inner flange 324 can include a radially inwardly extending annular portion 330 that can be coupled to an end of the main hub portion 320 opposite the engine cover 28d, and an annular portion 332 that can be coupled to a distal end of the radially inwardly extending annular portion 330 and extend generally parallel to the main hub portion 320. The annular portion 332 can define an interior annular clutch element engaging surface 336 having a diameter that can match that of the first portion 310 of the outer circumferential surface 100d of the drive hub 62d.

The clutch element 66d can comprise a spring that can be formed of a wire that is wrapped into a plurality of wire coils. The wire can be formed of a suitable material, such as a relatively hard spring steel, and can have an appropriate cross-sectional shape, such as a generally square or generally rectangular cross-sectional shape, in which the surfaces of the cross-sectional shape are generally flat or somewhat convex in shape. It will be appreciated, however, that the wire of the clutch element 66*d* could have any desired cross-sectional shape, including a round cross-sectional shape. Moreover, the wire could be a "plain" wire, or could be coated with a desired coating (e.g., nickel plating) and/or can be lubricated with a desired lubricant, such as a grease.

The clutch element 66*d* can be formed with several distinct zones, including a first zone 340, a second zone 342 and a third zone 344. The first zone 340 can be sized to engage the interior annular clutch element engaging surface 336 such that the clutch element 66*d* is coupled for rotation with the plate structure 64*d*. The third zone 344 can be sized to engage an interior annular surface 350 formed by the aperture 32 that extends through the annular projection 80*d* in the engine cover 28*d*. The second zone 342 can be disposed axially between the first zone 340 and the third zone 344 and can comprise a plurality of wire coils that are spaced apart generally concentrically from the first portion 310 of the outer circumferential surface 100*d* and the outer surface 312 of the end 34*d* of the crankshaft 16*d*. The clutch element 66*d* can include suitable transition zones between the between the first and second zones 340 and 342 and between the second and third zones 342 and 344. For example, the transition zone 360 between the first and second zones 340 and 342 can include one or more wire coils that increase in diameter from the first zone 340 to the second zone 342.

When the engine starter 20*d* is not being operated and the plate structure 64*d* is not being rotated at a speed that exceeds a rotational speed of the crankshaft 16*d*, the wire coils of the clutch element 66*d* are not engaged to the end 34*d* of the crankshaft 16*d* or the drive hub 62*d*. Accordingly, rotary power cannot be transmitted between the crankshaft 16*d* and the second pulley 44.

When the engine starter 20*d* is operated to drive the plate structure 64*d* at a rotational speed that exceeds a rotational speed of the crankshaft 16*d*, the clutch element 66*d* will rotate with the plate structure 64*d* as the first zone 340 is engaged to/coupled for rotation with the inner annular flange 324. Drag caused by contact between the third zone 344 of the clutch element 66*d* and the engine cover 28*d* will cause the clutch element 66*d* to coil more tightly as the clutch element 66*d* rotates such that the wire coils of the second zone 342 contact the first portion 310 of the outer circumferential surface 100*d* of the drive hub 62*d* and possibly the outer surface 312 of the end 34*d* of the crankshaft 16*d*. Engagement of the clutch element 66*d* to one or both of the first portion 310 of the outer circumferential surface 100*d* and the outer surface 312 permits rotary power to be transmitted from the plate structure 64*d* (which is driven by the second pulley 44) to the crankshaft 16*d* to start the engine and/or to aid in the propulsion of the vehicle.

Figure 12:
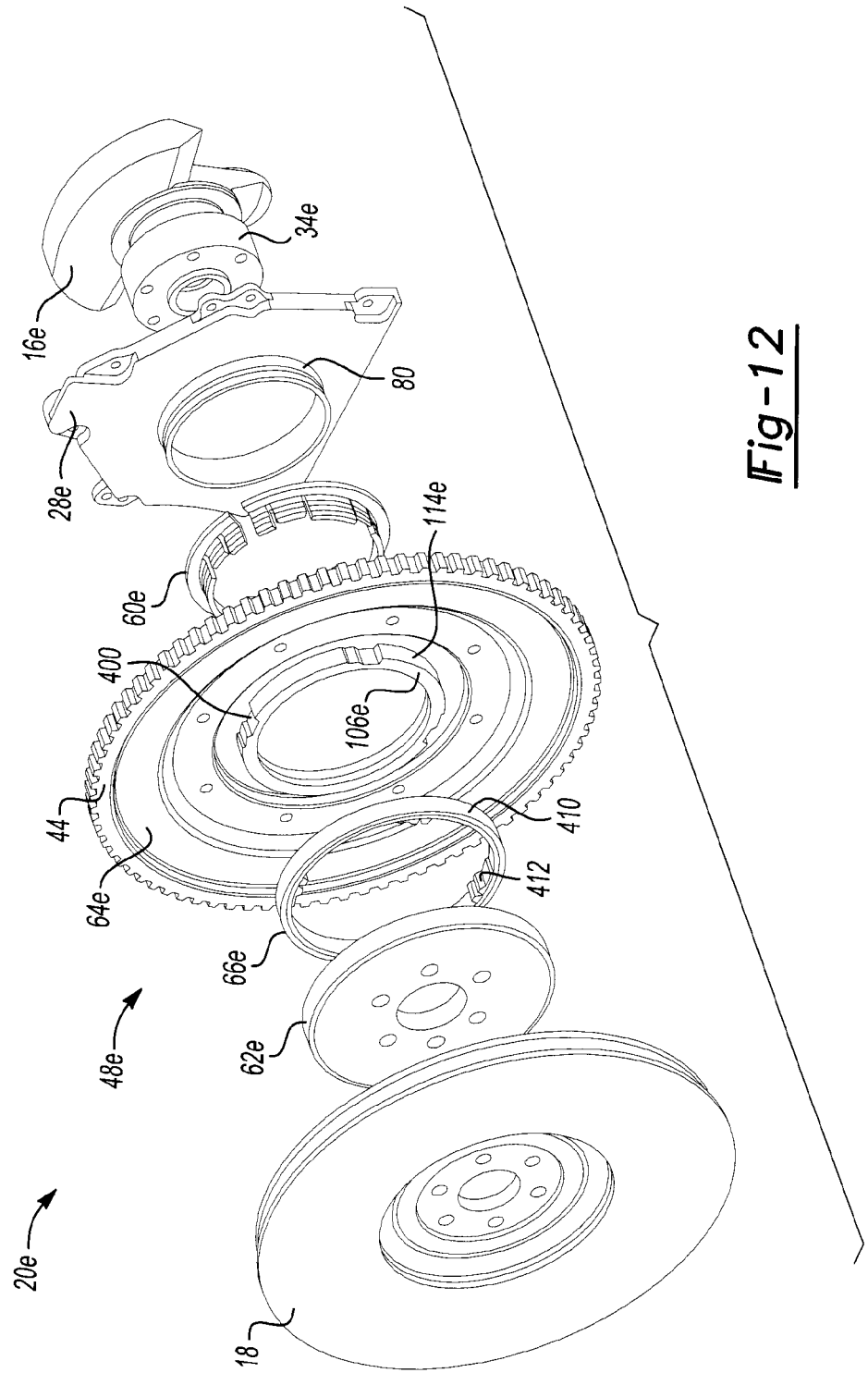
FIG. 12 is an exploded perspective view of a portion of another vehicle illustrating a sixth engine starter constructed in accordance with the teachings of the present disclosure.

In the example of FIGS. 12 through 14, the clutch 48*e* can include a bearing 60*e*, a drive hub 62*e*, a plate structure 64*e* and a clutch element 66*e*. The bearing 60*e* can be any type of bearing or bushing and can be received over the annular portion 80 of the engine cover 28*e*. In the particular example provided, the bearing 60*e* is configured to support the plate structure 64*e* for rotation on the annular projection 80 of the engine cover 28*e*, as well as to provide a bearing surface that is suited to receive thrust forces transmitted from the plate structure 64*e* to the engine cover 28*e*.

The drive hub 62*e* can include a central hub 90*e*, a circumferentially extending outer wall member 92*e* and a flange member 94*e* that can couple the central hub 90*e* to the wall member 92*e* so as to form an annular cavity 96*e* between the central hub 90*e* and the wall member 92*e*. One or more threaded fasteners (not shown) can be employed to fixedly but removably couple the flywheel 18 and the central hub 90*e* to the end 34*e* of the crankshaft 16*e* for rotation therewith. The wall member 92*e* can have an interior circumferential surface 100*e* that can be hardened in an appropriate manner (e.g., case hardened and/or nitrided).

While the drive hub 62*e* has been illustrated and described as being formed from a suitable metal, it will be appreciated that the drive hub 62*e* could be formed of several discrete components that can be assembled together. For example, a relatively soft material, such as a high quality rubber, a nylon, a combination of rubber and nylon, or a thermosetting material, such as phenolic, can be coupled to a metal structure such that the relatively soft material forms the interior circumferential surface 100*e* for increased compliance.

The plate structure 64*e* can be coupled to the second pulley 44 (or a ring gear) in any desired manner. For example, the plate structure 64*e* and the second pulley 44 could be integrally formed. In the particular example provided, however, the plate structure 64*e* is a weldment and the second pulley 44 is fixedly coupled to an outer circumferential portion of the plate structure 64*e*. In this regard, the plate structure 64*e* can comprise a first plate member 102*e* and a second plate member 104*e*. The first plate member 102*e* can include an annular portion 106*e* and a flange member 110*e* coupled to the annular portion 106*e* so as to extend radially outwardly therefrom. The annular portion 106*e* can be sized to be received over the bearing 60*e* such that the bearing 60*e* can support the annular portion 106*e* (and thereby the plate structure 64*e*) for rotation on the annular projection 80. The annular portion 106*e* can be received in the annular cavity 96*e* in the drive hub 62*e* and can include an outer circumferential surface 114*e* that can be spaced apart from the interior circumferential surface 100*e*. A plurality of clutch engagement features 400 can be formed onto or coupled to the annular portion 106*e*. In the particular example provided, the clutch engagement features 400 comprise recesses that are formed in the outer circumferential surface 114*e*. The flange member 110*e* can be shaped as desired so as to not contact the drive hub 62*e*. In the particular example provided, the flange member 110*e* includes an offset zone 124*e* that wraps around the wall member 92*e* of the drive hub 62*e* to aid in the formation of a labyrinth that is resistant to the ingress of material into/egress of material (e.g., a lubricant) out of the annular cavity 96*e*. The second plate member 104*e* can be coupled in any desired manner (e.g., fasteners, adhesives, brazing, welding) to the second flange member 110*e* and can include an outer rim portion 126*e* to which the second pulley 44 is fixedly coupled.

The clutch element 66*e* can comprise a band or clock-type spring that can comprise one or more spring elements 410 and one or more engagement members 412. Each of the spring elements 410 can be coiled about the rotational axis of the crankshaft 16*e* and received in the cavity 96*e* between the outer circumferential surface 114*e* and the interior circumferential surface 100*e*. The spring elements 410 can be configured such that they tend to uncoil and lay against the interior circumferential surface 100*e*. The engagement members 412 can be coupled to the one or more of the spring elements 410 can be engaged to the clutch engagement features 400 to inhibit relative rotation between an inner end of the one or more spring elements 410 and the plate structure 64*e*.

The one or more spring elements 410 of the clutch element 66*e* are wound in such a way that when the engine starter 20*e* is not being operated and the plate structure 64*e* is not being rotated at a speed that exceeds a rotational speed of the crankshaft 16*e*, the one or more spring elements 410 of the clutch element 66e tend to coil more tightly due to drag forces and do not drivingly engage the interior circumferential surface 100e of the drive hub 62e such that rotary power is not transmitted between the plate structure 64e, through the clutch element 66e to the drive hub 62e. Accordingly, rotary power cannot be transmitted between the crankshaft 16e and the second pulley 44.

When the engine starter 20e is operated to drive the plate structure 64e at a rotational speed that exceeds a rotational speed of the crankshaft 16e, the clutch element 66e will rotate with the plate structure 64e as the engagement members 412 can be engaged to the clutch engagement features 400. Drag forces created by contact between the one or more spring elements 410 of the clutch element 66e and the interior circumferential surface 100e of the drive hub 62e cause the clutch element 66e to uncoil such that the one or more spring elements 410 drivingly engage the interior circumferential surface 100e so that rotary power can be transmitted from the plate structure 64e (which is driven by the second pulley 44) to the crankshaft 16e to start the engine and/or to aid in the propulsion of the vehicle.

Figure 15:
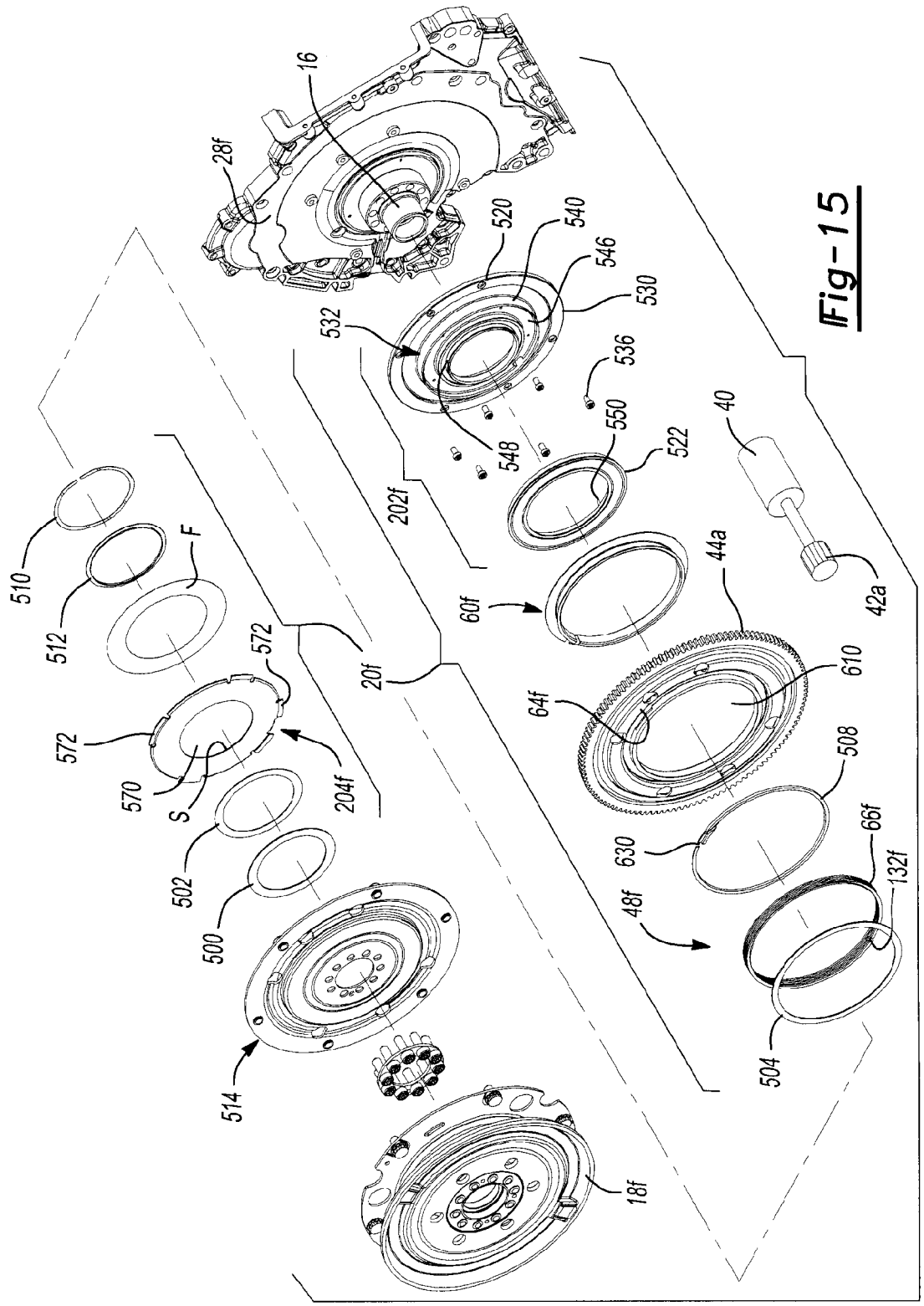
FIG. 15 is an exploded perspective view of a seventh engine starter constructed in accordance with the teachings of the present disclosure.
Figure 16:
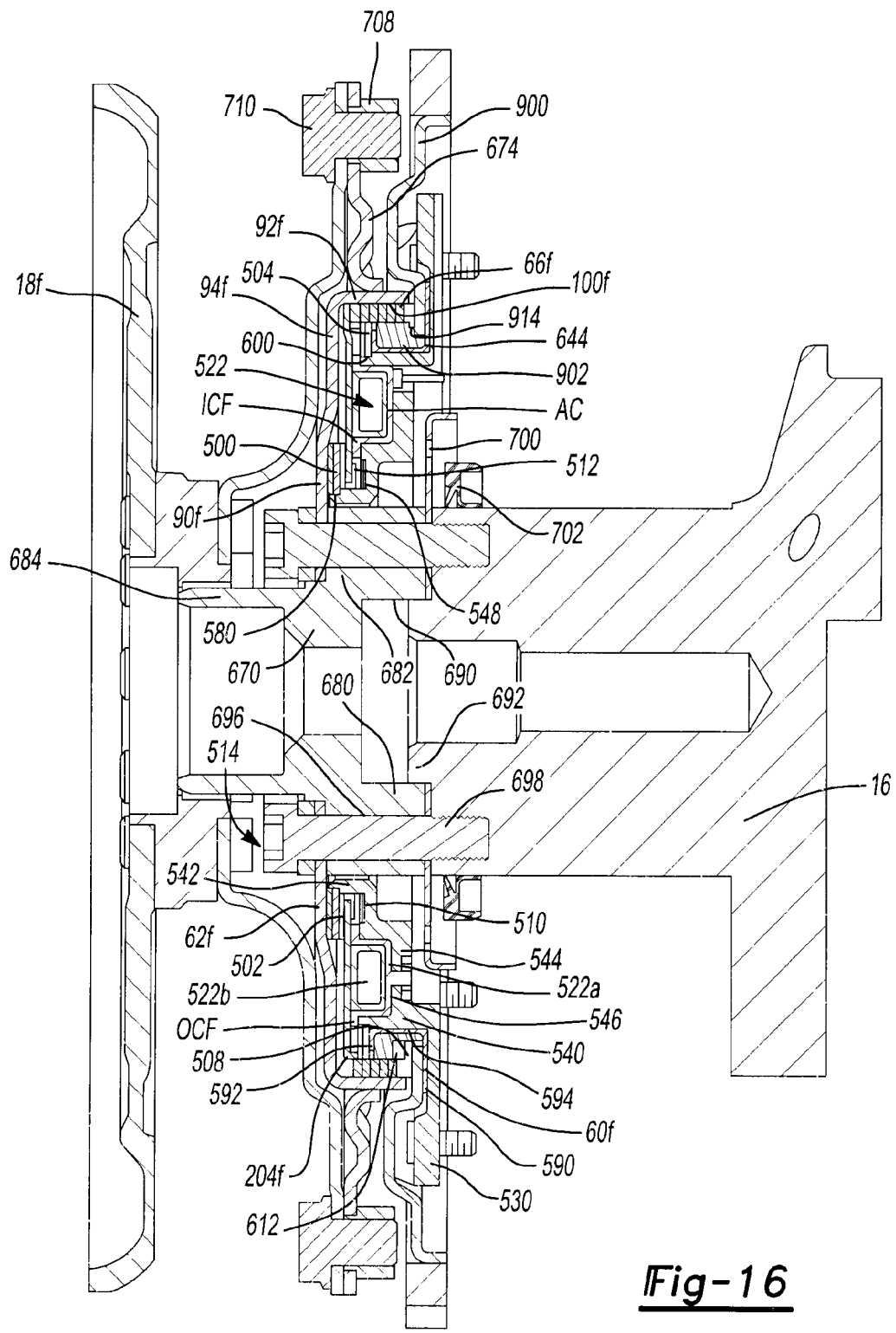
FIG. 16 is a longitudinal section view of the engine starter of FIG. 15.

The example of FIGS. 15 and 16 is generally similar to the example of FIGS. 7 through 9, except that the clutch is packaged somewhat differently into the engine starter and a friction material is incorporated into the electromagnetic actuator.

In FIG. 15, the engine starter 20f is illustrated to include a motor 40, a pinion gear 42a, a ring gear 44a and a clutch 48f. The clutch 48f can include an electromagnetic actuator 200f, a first retainer 500, a thrust washer 502, a bearing 60f, a second retainer 504, a plate structure 64f, a carrier 508, a clutch element 66f, a spring 510, a spacer 512, and a drive hub assembly 514.

The electromagnetic actuator 200f can include a coil assembly 202f and an armature 204f. The coil assembly 202f can include a coil housing 520 and a coil unit 522.

The coil housing 520 can define a mounting flange 530 and a mounting hub 532. The mounting flange 530 can be fixedly coupled to the engine cover 28f via a set of threaded fasteners 536. The mounting hub 532 can be disposed concentrically about the crankshaft 16 and can extend axially (i.e., along the rotational axis of the crankshaft 16) in a direction away from the engine cover 28f. The mounting hub 532 can define a first annular hub member 540, a second annular hub member 542, and a radial wall 544 into which an annular coil groove 546 and an annular spring recess 548 can be formed. The second annular hub member 542 can be concentric with and smaller in diameter than the first annular hub member 540.

The coil unit 522 can include a housing 522a and a coil 522b. The housing 522a can define an inner circumferential flange ICF, an outer circumferential flange OCF and an annular channel AC disposed between the inner circumferential flange ICF and outer circumferential flange OCF. The coil 522b can be received into the annular channel AC. The coil assembly 202f can be received in the coil groove 546 and can be fixedly mounted to the coil housing 520 so as to be disposed on a side of the coil housing 520 opposite the engine cover 28f. If desired, mating anti-rotation features, such as projections on the housing 522a and recesses in the coil housing 520, can be employed to inhibit rotation of the coil unit 522 relative to the coil housing 520. Leads 550 extending from the coil unit 522 can be routed in a desired manner, such as rearwardly through an aperture (not specifically shown) in the coil housing 520 and radially outwardly therefrom.

Figure 17:
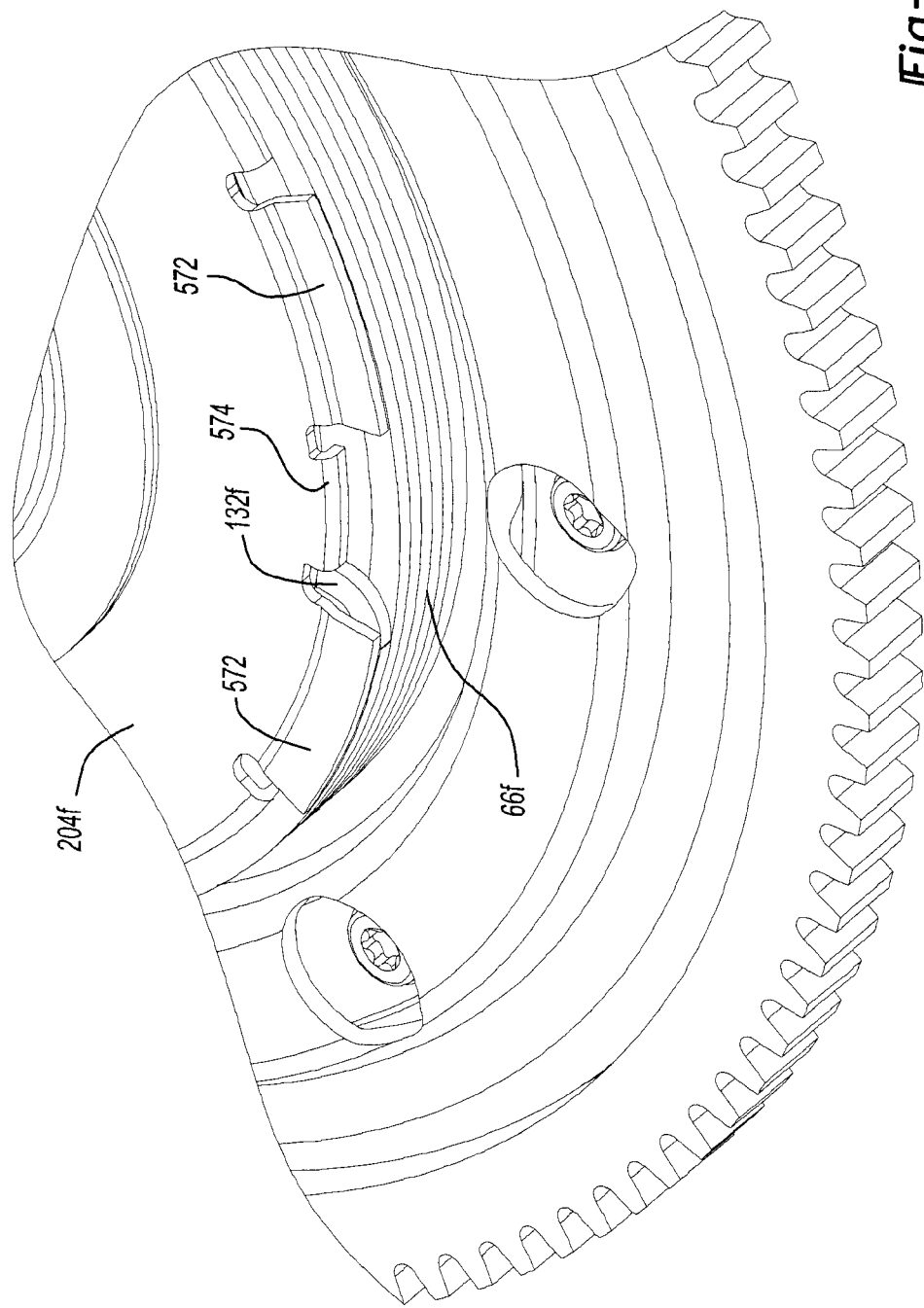
FIG. 17 is a perspective view of a portion of the engine starter of FIG. 15 illustrating the connection between an armature and an end of a clutch element.

With additional reference to FIG. 17, the armature 204f can be an annular structure that can define an armature aperture 570, one or more clutch member abutment tabs 572 and an engagement member 574 that can be abutted against a side of the second end 132f of the clutch element 66f, which has been bent in a radially inward direction in the particular example provided. The clutch member abutment tab(s) 572 can be configured to abut the clutch element 66f on a side opposite the plate structure 64f. In the example provided, the clutch member abutment tabs 572 are formed helically so as to engage a corresponding surface of the wire that forms the clutch element 66f. The armature 204f can be mounted for rotation on the second annular hub member 542.

Returning to FIGS. 15 and 16, the first retainer 500 can be mounted to the mounting flange 530 and can retain the armature 204f on the second annular hub member 542. For example, the first retainer 500 can comprise a snap ring that can be fit to a groove 580 in the second annular hub member 542, or could be secured to the mounting hub 532 via any conventional means, including welding, adhesives, and/or one or more threaded fasteners. The thrust washer 502 can be received between the armature 204f and the first retainer 500 and can form a bearing that permits the armature 204f to rotate without frictionally engaging the first retainer 500.

The bearing 60f can be any type of bearing and in the particular example illustrated, comprises a bushing that is received over the first annular hub member 540. The bearing 60f can have a rear lip 590, which can be abutted against the mounting flange 530, a front lip 592, which can be offset axially from the rear lip 590, and a cylindrical portion 594 that can be coupled at its opposite ends to the rear and front lips 590 and 592. The rear and front lips 590 and 592 cooperate with the cylindrical portion 594 to define an annular channel into which the carrier 508 can be received.

The second retainer 504 can be mounted to the mounting flange 530 and can retain the bearing 60f on the first annular hub member 540. For example, the second retainer 504 can comprise a snap ring that can be fit to a groove 600 in the first annular hub member 540, or could be secured to the mounting hub 532 via any conventional means, including welding, adhesives, and/or one or more threaded fasteners.

Figure 18:
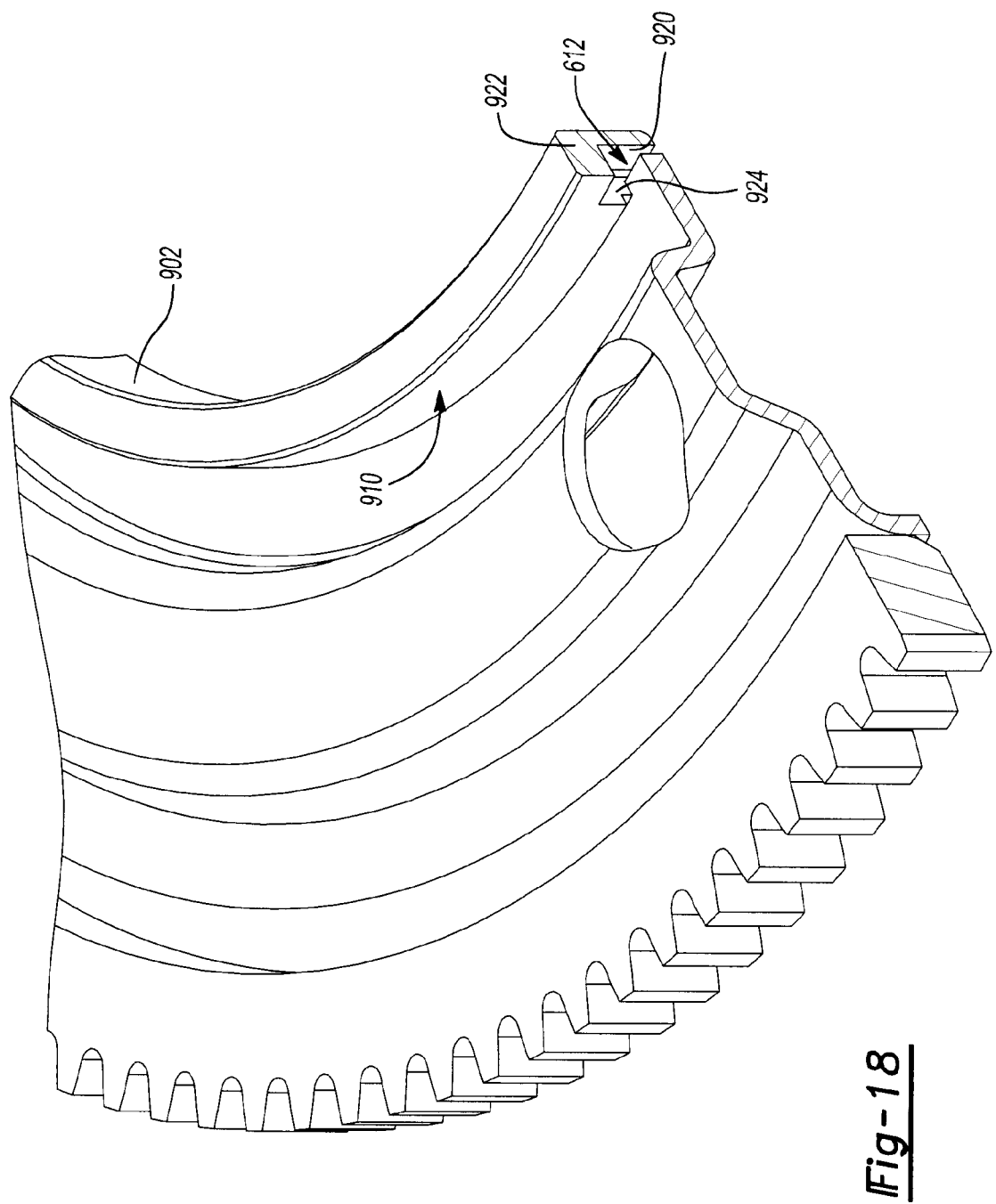
FIG. 18 is a perspective view in partial section of a portion of the engine starter of FIG. 15 illustrating the plate structure in more detail.

With additional reference to FIG. 18, the plate structure 64f can include an annular member 900 and an inner hub 902. The annular member 900 can be coupled to the ring gear 44a in any desired manner, such as a weld along its outer diameter that fixedly couples it to the ring gear 44a. The annular member 900 can define a central aperture 610 into which the inner hub 902 can be received. In the example provided, the inner hub 902 can include an outer cylindrical hub surface 910, a plate member groove 644 (FIG. 16), a carrier groove 914 (FIG. 16), and a clutch mount 612. The plate member groove 644 can be formed into the outer cylindrical hub surface 910 and can be configured to fit snugly into the central aperture 610 of the annular member 900 to locate the inner hub 902 in a concentric manner to the annular member 900. The inner hub 902 may be fixedly coupled to the annular member 900 in a desired manner, such as welding. The carrier groove 914 can be formed into the outer cylindrical hub surface 910 adjacent the plate member groove 644. The clutch mount 612 can comprise a mount aperture 920, a mount wall 922 and a reaction member 924. The mount aperture 920 can be formed into the outer cylindrical hub surface 910 such that the reaction member 924 is defined by an edge of the mount aperture 920 and the mount aperture 920 is situated between the mount wall 922 and the annular member 900. The reaction member 924 can be disposed at a predetermined orientation relative to the central (rotational) axis of the inner hub 902. For example, the reaction member 924 can be perpendicular to a circle that is centered on the rotational axis of the inner hub 902 and which intersects the reaction member 924. The inner hub 902 can be received in the annular channel of the bearing 60f.

Figure 19:
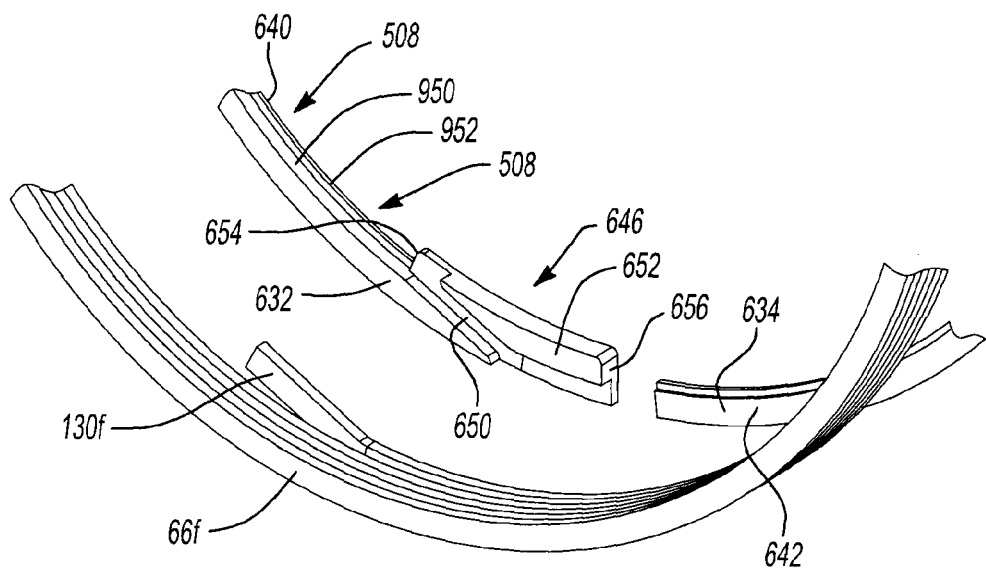
FIG. 19 is an enlarged portion of FIG. 15 illustrating the carrier and the clutch element in more detail.
Figure 20:
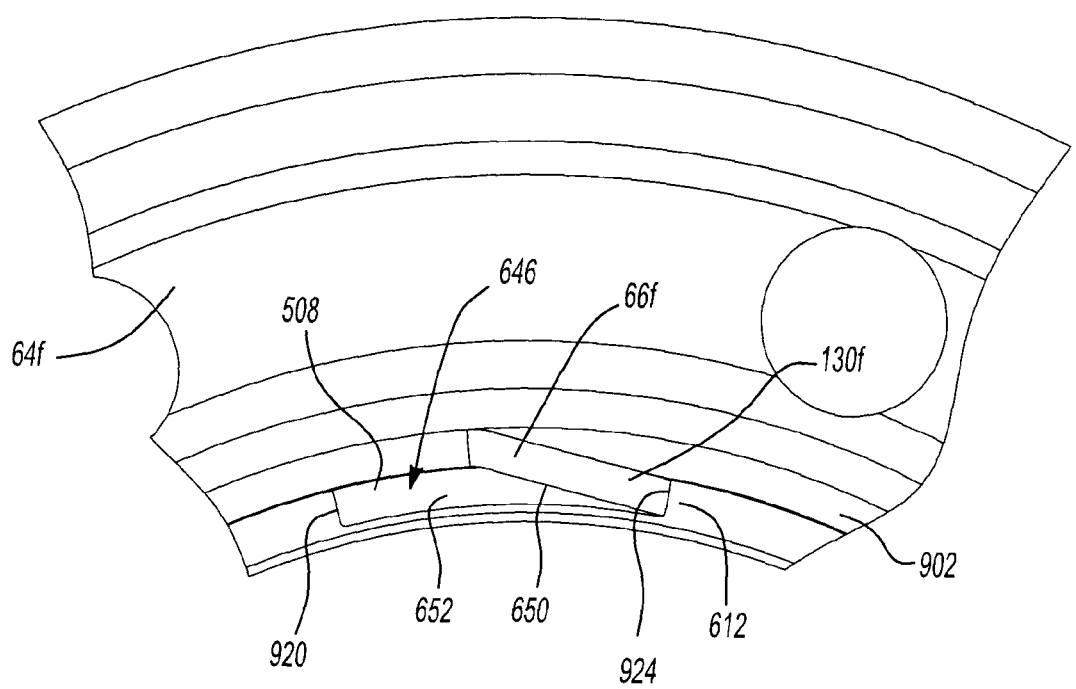
FIG. 20 is a plan view of a portion of the engine starter of FIG. 15 illustrating the coupling of the clutch element, the carrier and the plate structure.

With reference to FIGS. 15, 16 and 19, the carrier 508 can be formed so as to be radially compliant (i.e., being capable of radially expanding and contracting). In the particular example provided, the carrier 508 is split radially such that a gap 630 is disposed between two circumferential ends (i.e., the first and second ring ends 632 and 634, respectively). The carrier 508 can define an inner circumferential surface 950, a mounting lip 952, which can extend radially inwardly from the inner circumferential surface 950, a rear abutment surface 640, which can be abutted against a front face of the annular member 900, a clutch member abutment surface 642 and a clutch member mount 646 (FIG. 19). The inner circumferential surface 950 can be abutted to the outer cylindrical hub surface 910 and the mounting lip 952 can be received into the carrier groove 914 to locate the carrier 508 axially relative to the plate structure 64f. The rear abutment surface 640 can be configured to abut the annular member 900. All or portions of the clutch member abutment surface 642 can be configured to abut the clutch element 66f. In the particular example provided, the clutch member abutment surface 642 is helically formed along the rotational axis of the crankshaft 16 such that a thickness of the carrier 508 proximate the first ring end 632 is larger than a thickness of the carrier 508 proximate the second ring end 634. The clutch member mount 646 can be configured to retain the clutch element 66f, as well as to direct the first end 130f of the clutch element 66f into engagement with the plate structure 64f as will be described in more detail, below. In the example provided, the clutch member mount 646 is configured to be received into the mount aperture 920 in the clutch mount 612 of the plate structure 64f and includes a track 650, a radially inner wall 652 and first and second end surfaces 654 and 656, respectively. The track 650 can be formed (e.g., recessed into) the first ring end 632 to a level that corresponds to the level of the clutch member abutment surface 642 on the second ring end 634. It will be appreciated that all or portions of the track 650 could be formed in a helical manner that matches the helix of the clutch member abutment surface 642, or that all or portions of the track 650 could be formed parallel to the rear abutment surface 640. The track 650 can be contoured in a desired manner, such as in a radially inward manner, and can terminate at the reaction member 924 of the clutch mount 612 on the plate structure 64f such that the first end 130 of the clutch element 66f directly contacts the reaction member 924. Alternatively, the track 650 could terminate prior to the reaction member 924 such that load transmitted to the first end 130f of the clutch element 66f is initially transmitted between the reaction member 924 and the first end surface 64 of the clutch mount 612. Construction in this latter manner may be advantageous when, for example, it is necessary or desirable to increase the surface area over which power is transmitted between the clutch element 66f and the plate structure 64f.

Returning to FIGS. 15 and 16, the spring 510 can be configured to bias the armature 204f toward the first retainer 500 and in the particular example provided, comprises a wave spring that is received in the annular spring recess 548 that is formed in the radial wall 544 of the mounting hub 532. The spacer 512 can be disposed between the spring 510 and the armature 204f and can cooperate with the spring 510 to cause a desired biasing force to be applied to the armature 204f. If desired, the spacer 512 could also function as a thrust washer.

The drive hub assembly 514 can include a hub member 670, a drive hub 62f and a radial flange 674.

The hub member 670 can be co-formed with the drive hub 62f, but in the particular example provided, comprises a discretely formed member having a first pilot portion 680, a bolt flange 682, and a second pilot portion 684. The first pilot portion 680 can be configured to center the clutch 48f to the crankshaft 16. In the particular example provided, the first pilot portion 680 comprises a bore 690 that matingly engages a cylindrical projection 692 on the crankshaft 16 but it will be appreciated that various other types of centering means can be employed, including pins, or that an assembly tool (not shown) may be employed in lieu of a mating connection between the first pilot portion 680 and the crankshaft 16. The bolt flange 682 can define a plurality of bolt holes 696 through which bolts 698 can be received to fixedly but removably couple the drive hub assembly 514 to the crankshaft 16. If desired, a shield member 700 may be received between the crankshaft 16 and the hub member 670 to shield an oil seal 702 that is located between the engine cover 28f and the crankshaft 16. The hub member 670 can extend axially away from the crankshaft 16 and through the mounting hub 532 such that the second pilot portion 684 extends therefrom. The flywheel 18f can be configured to matingly engage the second pilot portion 684 to center the flywheel 18f relative to the rotational axis of the crankshaft 16.

The drive hub 62f can include a central hub 90f, a circumferentially extending outer wall member 92f and a flange member 94f that can couple the central hub 90f to the wall member 92f so as to form an annular cavity between the central hub 90f and the wall member 92f. The central hub 90f can be received over the hub member 670 and the bolts 698 that couple the hub member 670 to the crankshaft 16 can also be employed to fixedly couple the central hub 90f to the hub member 670 for rotation therewith. The wall member 92f can have an interior circumferential surface 100f that can be hardened in an appropriate manner (e.g., case hardened and/or nitrided). The radial flange 674 can be fixedly coupled to and extend radially outwardly from the drive hub 62f.

The radial flange 674 can be fixedly coupled to an outer surface of the circumferentially extending outer wall member 92f and can comprise a plurality of female threaded nuts 708 that are spaced apart about the circumference of the radial flange 674. Threaded fasteners 710 can be employed to fixedly but removably couple the flywheel 18f to the radial flange 674.

It will be appreciated, however, that the radial flange 674 may be omitted altogether and that the bolts 698 that couple the hub member 670 to the crankshaft 16 could also be employed to couple the flywheel 18f to the crankshaft 16.

When the engine is to be started, the motor 40 can be energized and can transmit rotary power via the pinion 42a and the ring gear 44a to the plate structure 64f, which will cause rotation of the clutch element 66f about the mounting hub 532. Simultaneously with the energization of the motor 40, the coil 522b can be energized to cause the armature 204f to travel axially and frictionally engage the coil housing 520 of the coil assembly 202f. As the second end 132 of the clutch element 66f is engaged to the armature 204f and as the first end 130 of the clutch element 66f is engaged to the rotating plate structure 64f, rotary motion will be transmitted through the clutch element 66f so that the armature 204f would tend to rotate. Frictional engagement between the armature 204f and the coil housing 520 is sufficiently strong so as to resist rotation of the armature 204f (and therefore the second end 132 of the clutch element 66f) and causes the wire of the clutch element 66f to uncoil or unwind such that it frictionally engages the interior circumferential surface 100f of the drive hub 62f to transmit rotary power into the drive hub 62f to thereby drive the crankshaft 16.

When the engine has been started, the motor 40 and the coil 522b can be de-energized to disengage the clutch 48f. The spring 510 can bias the armature 204f away from the coil housing 520 when the coil 522b has been de-energized such that the armature 204f will rotate with the wire coils of the clutch element 66f. The plate structure 64f, however, will slow relative to the rotational speed of the crankshaft 16 and drive hub 62f, which will cause the first end 130 of the clutch element 66f to slow and consequently the wire of the clutch element 66f will coil or wind more tightly such that it disengages the interior circumferential surface 100f of the drive hub 62f to permit the plate structure 64f to be rotationally decoupled from the drive hub 62f and the crankshaft 16.

If provided, the radial compliance of the carrier 508 can aid in the installation of the carrier 508 to the inner hub 902 of the plate structure 64f, as well as permit a small degree of rotation between the plate structure 64f and the carrier 508/clutch element 66f and/or radial contraction of the carrier 508 when rotary power is initially transmitted from the plate structure 64f to the carrier 508 to engage the clutch assembly. Such compliance can render the carrier 508 more tolerant of manufacturing tolerances while ensuring that the carrier 508 is not overloaded during engine starting.

It will be appreciated that in each of the above-described engine starters, a friction material could be employed on the surfaces of one or more of the components to control engagement of the clutch assembly. In FIGS. 15 through 19, for example, the friction material can be part of the armature 204f and/or of another structure that is configured to limit movement of the armature 204f in a predetermined direction (e.g., toward the coil 522b), such as one or both of the outer circumferential flange OCF and the inner circumferential flange ICF of the housing. In the particular example provided, however, a friction material F is coupled only to the surface S of the armature 204f that is configured to frictionally engage the inner and outer circumferential flanges ICF and OCF of the housing 522a. The friction material F can be formed of any desired thickness, such as a thickness of 1.0 mm or less. For example, the friction material F can have a thickness that is greater than or equal to 0.15 mm and less than or equal to 0.4 mm, such as a maximum thickness that is less than or equal to 0.25 mm, and can provide a coefficient of static friction that is greater than or equal to 0.12. Exemplary materials include MF701 and HM200 friction papers marketed by Miba Hydramechanica of Sterling Heights, Mich. It will be appreciated that while the MF701 and HM200 are friction papers for wet (i.e., oil lubricated) applications, various other types of friction materials, including those configured for dry (i.e., non-lubricated) applications could be employed. While optional, the use of a desired friction material F can provide several benefits, including less slipping at the interface between the armature 204f and the housing 522a, which we believe will reduce the time required for engagement of the clutch assembly as well as provide enhanced durability.

It will be appreciated that in each of the above-described engine starters, a lubricating oil in the engine block that is employed to lubricate engine components (including the crankshaft) is not employed to lubricate the clutch element. Configuration in this manner can be advantageous in some situations as oil seals for containing the engine lubricating oil are not required. Consequently, the starter systems described above may be employed in non-traditional areas, including the front of the engine. It will be appreciated, however, that lubrication of the clutch element may be necessary and/or desirable in some situations and as such, the scope of present disclosure is not to be limited to engine starters having a clutch element that is not lubricated with engine lubricating oil.

Figure 21:
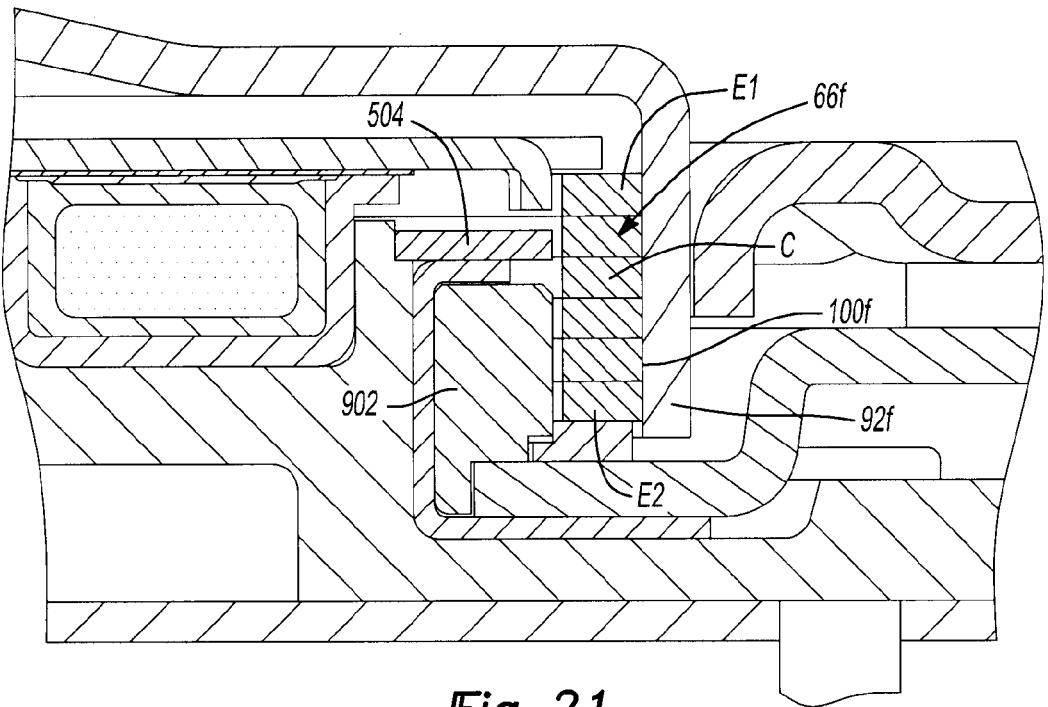
FIG. 21 is an enlarged view of a portion of the engine starter of FIG. 15 illustrating the clutch element fully engaged to the interior circumferential surface of the wall member.
Figure 22:
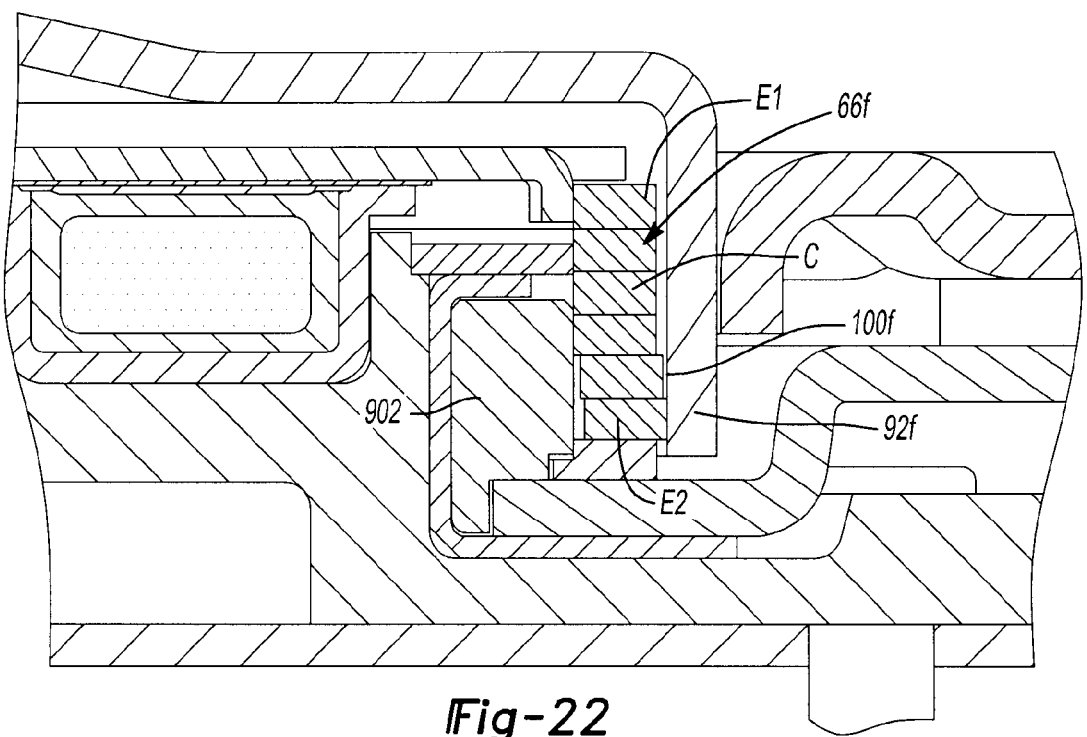
FIG. 22 is a view similar to that of FIG. 21 but depicting coils of the clutch element coiled tightly about the inner hub causing coils of the clutch element to remain in engagement with the interior circumferential surface.

It will be appreciated that in certain situations, it may be possible for the clutch element in any of the above-described examples to remain partially engaged so that the plate structure and the flywheel are coupled for rotation with one another. With reference to FIGS. 21 and 22, which depicts a portion of the engine starter of FIG. 15, it is possible for one of the coils C of the clutch element 66f to maintain engagement with the interior circumferential surface 100f of the wall member 92f. In this regard, transitioning from the fully engaged state depicted in FIG. 21 (i.e., a state where the clutch element 66f is fully engaged to the interior circumferential surface 100f) to a disengaged state includes the coiling (radially inwardly) of the coils of the clutch element 66f. The coiling begins at a first end E1 and transitions from coil to coil toward a second, opposite end E2. Should one or more of the coils C between the first and second ends E1 and E2 coils tightly to (i.e., frictionally engages) the inner hub 902, they will impede or arrest the coiling of the remaining coils located between the intermediate coil(s) that is/are engaged to the inner hub 902 and the second end E2, causing one or more of the remaining coils C to remain engaged to the interior circumferential surface 100f as shown in FIG. 22.

To prevent the occurrence of this issue, a sleeve, bearing or bushing can be employed on a radially inward side of the clutch element of any of the foregoing examples. With reference to the example of FIG. 23, various components such as the second retainer 504g, the inner hub 902g, can be modified to accommodate an annular sleeve 1000 that can be received over the inner hub 902g. In this regard, the second retainer 504g can be somewhat smaller in diameter than the second retainer 504 depicted in FIG. 21, while a circumferential groove or step 1002 can be formed in the inner hub 902g to accommodate the sleeve 1000 such that the sleeve 1000 can freely rotate about the inner hub 902g. The sleeve 1000 can be formed of any appropriate material. In the particular example provided, we used steel, but it will be appreciated that other materials, including structural plastic materials, could be used in the alternative. The sleeve 1000 can have a length configured to engage all or a portion of the coils of the clutch element 66f when the clutch element 66f coils to disengage the interior circumferential surface 100f. In the particular example provided, the sleeve 1000 has a length that can at least partly accommodate (i.e., frictionally engage at least a portion of the inside surface of) all of the coils of the clutch element 66f, but it will be appreciated that it may be beneficial in some situations to size the sleeve 1000 such that the last coil $C_{END}$ at the second end E2g does not engage the sleeve 1000.

Figure 23:
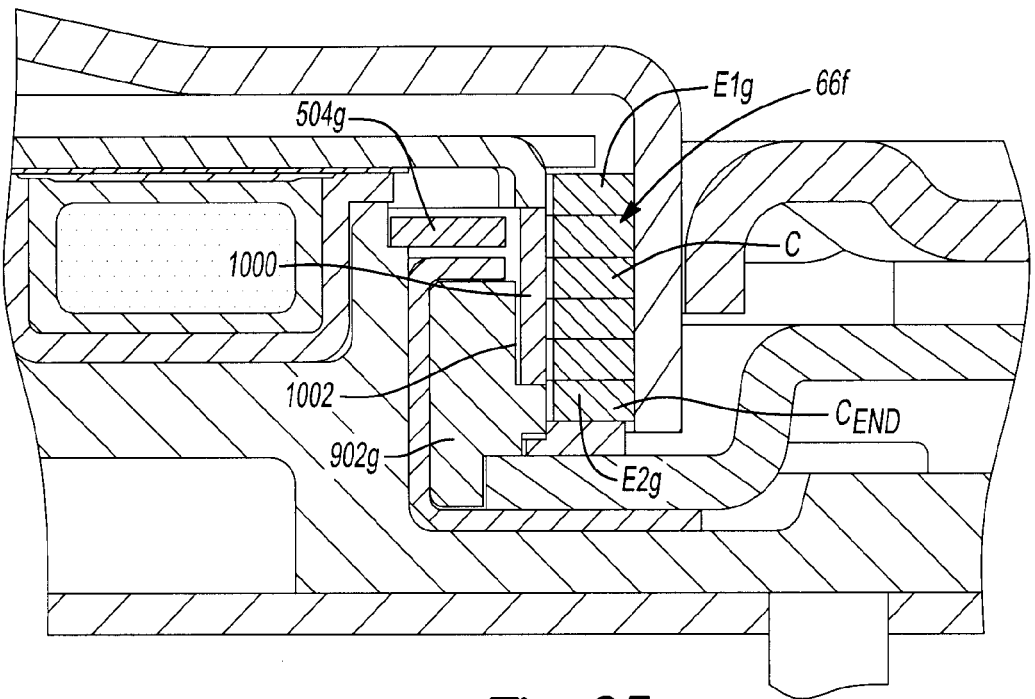
FIG. 23 is a view of a portion of another engine starter constructed in accordance with the teachings of the present disclosure, the view being similar to that of FIG. 21 and depicting the clutch element fully engaged to the interior circumferential surface of the wall member.
Figure 24:
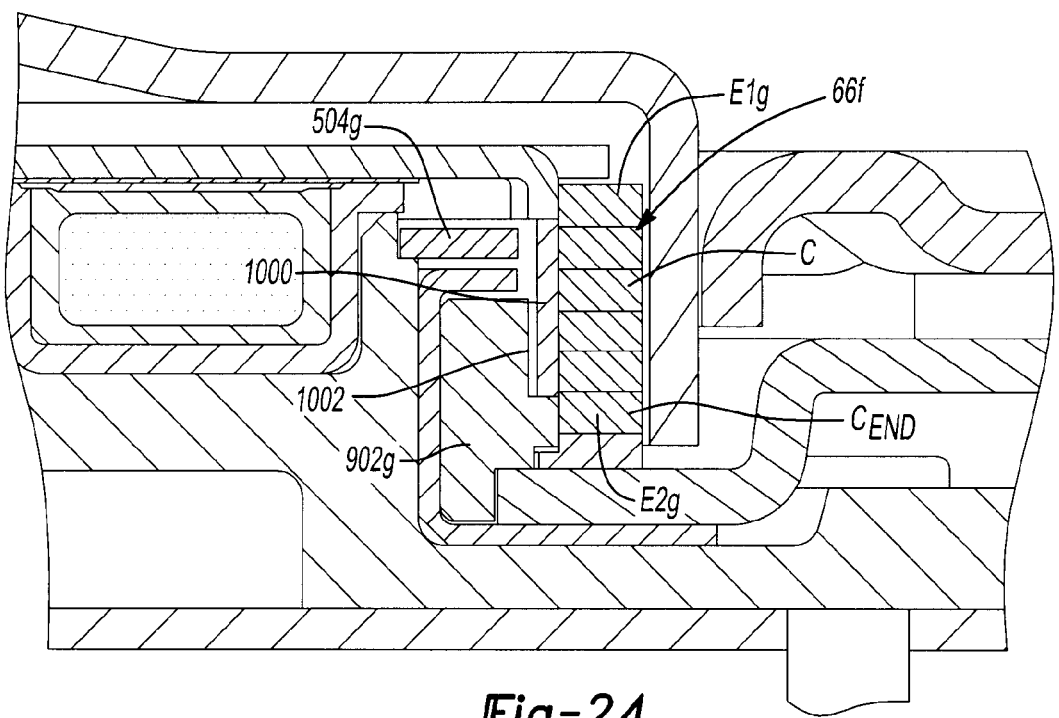
FIG. 24 is a view similar to that of FIG. 23 but depicting the coils of the clutch element completely coils away from the interior circumferential surface.

Transitioning from the fully engaged state depicted in FIG. 23 (i.e., a state where the clutch element 66f is fully engaged to the interior circumferential surface 100f) to a disengaged state includes the coiling (radially inwardly) of the coils of the clutch element 66f. As with the previous example, the coiling begins at the first end E1g and transitions from coil to coil toward a second, opposite end E2g. Should one or more of the coils C between the first and second ends E1g and E2g coil tightly to (i.e., frictionally engage) the sleeve 1000, the sleeve 1000 can rotate relative to the inner hub 902g so as not to impede or arrest the coiling of the remaining coils located between the intermediate coil(s) that is/are engaged to the inner hub 902g and the second end E2g so that the clutch element 66f can fully disengage the interior circumferential surface 100f as shown in FIG. 24.

From the above discussion, it will be appreciated that a sleeve may be incorporated into any of the above examples between the clutch element and the component which transmits rotary power into the clutch element from the ring gear (e.g., the ring gear in some examples).

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An engine starter apparatus comprising:
   a clutch assembly having a plate structure, a drive hub, a clutch element for selectively coupling the drive hub to the plate structure; and
   a ring gear or a pulley coupled to the plate structure;
   wherein the clutch assembly further comprises an actuator that includes a member that is movable to selectively initiate engagement of the clutch element to a circumferentially extending surface of the drive hub, the clutch element comprising a helically wound spring wire having a first end and a second end, the first end of the helically wound spring wire being configured to receive rotary power from the plate structure, the second end being coupled to the member for rotation therewith; and
   wherein the clutch assembly further comprises a sleeve that is rotatably mounted about the plate structure, wherein at least a portion of the helically wound spring wire coils against the sleeve when the clutch assembly is fully disengaged.

2. The engine starter apparatus of claim 1, wherein the sleeve is sized such that a last coil of the helically wound spring wire does not engage the sleeve.

3. The engine starter apparatus of claim 1, wherein the sleeve has a length that is configured to receive at least a portion of each of the coils of the clutch element.

4. The engine starter apparatus of claim 1, further comprising a carrier, wherein the carrier comprises a clutch member mount to which the first end of the helically wound spring wire is coupled, the clutch member mount being received into a clutch mount on the plate structure.

5. The engine starter apparatus of claim 4, wherein the clutch member mount comprises a track that receives the first end of the helically wound spring wire and a radially inner wall that limits movement of the first end of the helically wound spring wire in a radially inward direction.

6. The engine starter apparatus of claim 4, wherein a gap is disposed between circumferential ends of the carrier.

7. The engine starter apparatus of claim 1, further comprising a friction material coupled to the member.

8. The engine starter apparatus of claim 1, wherein the actuator comprises a coil assembly that is selectively operable for generating an electromagnetic field for moving the member.

9. The engine starter apparatus of claim 8, further comprising a friction material coupled to the coil assembly.

10. The engine starter apparatus of claim 8, wherein the coil assembly comprises a coil housing and a coil unit that is mounted to the coil housing, the coil housing being configured to be removably coupled to an engine.

11. The engine starter apparatus of claim 1, wherein the member comprises a plurality of abutment tabs that are configured to contact an axial end of the helically wound spring wire.

12. The engine starter apparatus of claim 1, wherein the member comprises an engagement member that is configured to contact the second end of the helically wound spring wire to initiate disengagement of the clutch element from the circumferentially extending surface of the drive hub.

13. An engine starter apparatus comprising:
    a clutch assembly having a plate structure, a drive hub, a clutch element for selectively coupling the drive hub to the plate structure; and
    a ring gear or a pulley coupled to the plate structure;
    wherein the clutch element comprises a clock-type spring and an engagement member that drivingly couples the clock-type spring to the plate structure, and wherein driving of the plate member causes the clock-type spring to engage a circumferentially extending surface of the drive hub; and
    wherein the clutch element is a wrap spring having a plurality of zones, each zone being formed to a different diameter and wherein rotation of the plate structure causes at least one of the zones of the clutch element to constrict to thereby transmit rotary power between the plate structure and the drive hub.

14. An engine starter apparatus comprising:
    a clutch assembly having a plate structure, a drive hub, a clutch element for selectively coupling the drive hub to the plate structure; and
    a ring gear or a pulley coupled to the plate structure;
    wherein the clutch element comprises a helically wound spring wire having a first end, a second end and a plurality of coils between the first and second ends, the first end of the helically wound spring wire being configured to receive rotary power from the plate structure, wherein a portion of the coils are in constant engagement with the drive hub; and
    wherein the clutch assembly further comprises an actuator that includes a member that is movable between a first position and a second position, wherein a remaining portion of the coils are spaced apart from the drive hub when the member is in the first position, and wherein positioning of the member in the second position while the plate structure is rotating in a predetermined rotational direction and the drive hub is not rotating permits the remaining portion of the coils to engage the drive hub.

* * * * *